(12) United States Patent
Yamaguchi et al.

(10) Patent No.: US 7,523,789 B2
(45) Date of Patent: Apr. 28, 2009

(54) TRACTOR

(75) Inventors: Tatsuo Yamaguchi, Osaka (JP); Noboru Yamamoto, Osaka (JP); Toshiyuki Shin, Osaka (JP); Shigenori Sakikawa, Amagasaki (JP); Shingo Araki, Amagasaki (JP)

(73) Assignee: Yanmar Co., Ltd., Osaka (JP)

( * ) Notice: Subject to any disclaimer, the term of this patent is extended or adjusted under 35 U.S.C. 154(b) by 263 days.

(21) Appl. No.: 10/594,346

(22) PCT Filed: Mar. 25, 2005

(86) PCT No.: PCT/JP2005/005539

§ 371 (c)(1),
(2), (4) Date: Sep. 26, 2006

(87) PCT Pub. No.: WO2005/092075

PCT Pub. Date: Oct. 6, 2005

(65) Prior Publication Data

US 2007/0207021 A1    Sep. 6, 2007

(30) Foreign Application Priority Data

Mar. 26, 2004  (JP) .............................. 2004-093311
Aug. 31, 2004  (JP) .............................. 2004-252342

(51) Int. Cl.
*A01B 59/043*    (2006.01)

(52) U.S. Cl. ................... 172/439; 251/319; 414/703
(58) Field of Classification Search ................. 414/703; 172/439; 180/53.3; 251/319, 320, 324
See application file for complete search history.

(56) References Cited

U.S. PATENT DOCUMENTS

| 4,357,031 A * | 11/1982 | Berg .......................... 172/439 |
| 5,029,650 A * | 7/1991 | Smit ............................ 172/5 |
| 6,076,804 A * | 6/2000 | Cabrera ..................... 251/320 |
| 6,182,771 B1 | 2/2001 | Nakamura et al. |

FOREIGN PATENT DOCUMENTS

| CN | 2820601 | 9/2006 |
| JP | 63-148113 | 9/1988 |
| JP | 2000-092911 | 4/2000 |
| JP | 2002-283861 | 10/2002 |
| JP | 2003-304709 | 10/2003 |

\* cited by examiner

*Primary Examiner*—Donald Underwood
(74) *Attorney, Agent, or Firm*—Jordan and Hamburg LLP

(57) ABSTRACT

A tractor of the present invention can reduce a manufacturing cost of a lift arm support body. The tractor is configured such that a lift arm is mounted on an upper portion of a transmission casing by way of a lift arm support body, the lift arm is hydraulically controllable by a hydraulic control valve by way of a hydraulic circuit body, and the hydraulic circuit body and the hydraulic control valve are fixed to the transmission casing as bodies separate from a lift arm support body.

3 Claims, 22 Drawing Sheets

TRACTOR

BACKGROUND OF THE INVENTION:

1. Technical Field

The present invention relates to a tractor which detachably mounts a hydraulic circuit body and a hydraulic control valve on a transmission casing.

2. Background Art

Conventionally, as a type of tractor, there has been known a tractor in which a hydraulic casing is communicably connected with an upper portion of a transmission casing, a lift arm support shaft which has an axis thereof extended in the lateral direction penetrates the hydraulic casing, proximal end portions of a pair of left and right lift arms are mounted on left and right-side end portions of the lift arm support shaft, a proximal end portion of an operating arm is mounted on a midst portion of the lift arm support shaft, a distal end portion of a lift cylinder which is arranged in the inside of the hydraulic casing in a lying manner is connected to a distal end portion of the operating arm, and a lift arm is vertically and rotatably operated in an interlocking manner with the extending and contracting operation of the lift cylinder (for example, see Japanese Patent Laid-open 2002-283861).

Further, a hydraulic circuit is formed in the hydraulic casing, and a lubricant in the inside of the transmission casing is allowed to pass through the hydraulic circuit as a working oil so as to perform the extension-contraction operation of the lift cylinder.

However, with respect to the above-mentioned tractor, since the hydraulic casing is often formed by casting and hence, there may be a case that small cavities, that is, so-called blowholes are formed in the hydraulic casing. When the hydraulic circuit is formed in such a hydraulic casing, there may arise a drawback that the pressurized oil leaks at blowhole portions.

This brings about a drawback that the whole hydraulic casing is scrapped or disposed and hence, an economical loss is large.

Further, in the above-mentioned tractor, the lubricant in the inside of the transmission casing is supplied to the lift cylinder under pressure as a working oil so as to operate the lift cylinder. Accordingly, when a hydraulic filter is clogged with dusts such as worn-out pieces which are constantly generated due to the meshing of gears in the inside of the transmission casing, the dusts flow into a hydraulic control valve formed in the midst of the hydraulic circuit through a bypass circuit and hence, there exists the possibility that the operation of the hydraulic control valve becomes defective.

Accordingly, there has been adopted the structure in which a partition plate is interposed between the hydraulic casing and the transmission casing so as to separate the working oil in the inside of the hydraulic casing and the lubricant in the inside of the transmission casing.

However, such separation structure suffers from following drawbacks.

(1) In performing the performance/function inspection of the hydraulic control valve, to prevent the leaking of the working oil, it is necessary to perform the inspection in a state that the hydraulic casing is mounted on the transmission casing. Accordingly, the inspection device becomes large-sized and there exists the cumbersomeness that a human power is insufficient for handling the inspection device and a transport assist device is necessary.

(2) It is necessary to prevent the leaking of oil on both surfaces of the partition plate and hence, the highly accurate flatness is required with respect to both surfaces of the partition plate.

(3) Since the partition plate is interposed between the hydraulic casing and the transmission casing, a height on the ground of the hydraulic casing is increased by an amount corresponding to a wall thickness of the partition plate whereby the degree of freedom in designing a mounting height of a driver's seat which is arranged right above the hydraulic casing is small.

SUMMARY OF THE INVENTION (1) According to the first aspect of the present invention, a lift arm is mounted on an upper portion of a transmission casing by way of a lift arm support body, the lift arm is hydraulically controllable by a hydraulic control valve by way of a hydraulic circuit body, and the hydraulic circuit body and the hydraulic control valve are detachably mounted on the transmission casing as bodies separate from a lift arm support body.

In this manner, the hydraulic circuit body and the hydraulic control valve are constituted as bodies separate from the lift arm support body. Accordingly, even when blowholes are formed in the lift arm support body which is formed by casting, a pressurized oil is not allowed to pass through the lift arm body and hence, it is no more necessary to worry about the adverse influence attributed to the blowholes such as the leaking of oil or the like.

Further, in forming the lift arm support body, it is possible to simplify a shape of the lift arm support body compared to a conventional lift arm support body and hence, it is possible to easily take measures to cope with the occurrence of blowholes whereby a yield rate of the lift arm support body can be enhanced whereby the manufacturing cost can be reduced.

Still further, the lift arm support body per se can be minimized as much as possible and hence, it is possible to acquire the easiness of handling of the lift arm support body during manufacturing and forming as well as the reduction of the manufacturing cost.

Further, it is possible to detachably mount the hydraulic circuit body and the hydraulic control valve without removing the lift arm support body which is a relatively heavy object from the transmission casing and hence, it is possible to ensure the favorable maintenance.

(2) According to the second aspect of the present invention, the lift arm support body is extended frontwardly to form a hydraulic circuit body support member and the hydraulic circuit body is mounted on and fixed to the hydraulic circuit body support member.

In this manner, the hydraulic circuit body is mounted on and fixed to the hydraulic circuit body support member which is formed by extending the lift arm support body frontwardly. Accordingly, it is possible to fix the hydraulic circuit body to the hydraulic circuit body support member in a state that the lift arm support body is preliminarily fixed to the transmission casing or it is possible to integrally mount the hydraulic circuit body support member and the hydraulic circuit body on the transmission casing in a state that the hydraulic circuit body is preliminarily fixed to the hydraulic circuit body support member whereby it is possible to effectively perform the assembling operation corresponding to working conditions and the like.

(3) According to the third aspect of the present invention, the hydraulic control valve is mounted on the hydraulic circuit body.

In this manner, by mounting the hydraulic control valve on the hydraulic circuit body, it is possible to arrange the hydraulic control valve and the hydraulic circuit body in a compact and concentrated manner and, at the same time, it is possible to integrally fix the hydraulic control valve and the hydraulic circuit body to the lift arm support body or the hydraulic circuit body support member whereby the assembling performance of these parts can be enhanced.

Further, in the hydraulic circuit body which is constituted as the separate body from the lift arm support body, it is possible to arrange valves and the like in a concentrated manner and hence, it is possible to form the hydraulic circuit body in a compact manner.

(4) According to the fourth aspect of the present invention, a lift arm is mounted on an upper portion of the transmission casing by way of a lift arm support body and, at the same time, the lift arm is hydraulically controllable by a hydraulic control valve by way of a hydraulic circuit body which is detachably mounted on the lift arm support body, a valve cover body is mounted on the hydraulic circuit body, the hydraulic control valve is housed in the inside of the valve cover body, and a drain in the hydraulic control valve can be discharged through a drain circuit formed in the inside of the hydraulic circuit body by way of a drain receiving space which is formed in the inside of the valve cover body.

In this manner, by mounting the valve cover body on the hydraulic circuit body which is detachably mounted on the lift arm support body and by housing the hydraulic control valve in the inside of the valve cover body, it is possible to perform the performance/function inspection of the hydraulic control valve before mounting the hydraulic circuit body and the valve cover body on the lift arm support body.

As a result, it is possible to realize the easiness of the performance/function inspection, the miniaturization of the inspection device, and easiness of handling which requires human power.

(5) According to the fifth embodiment of the present invention, the hydraulic circuit body is mounted on the transmission casing by way of the lift arm support body, an upper end peripheral portion of an upper-surface open-ended box-like valve cover body is hermetically mounted on a lower portion of the hydraulic circuit body, and a lower portion of the valve cover body is arranged in the inside of the transmission casing.

In this manner, by mounting the hydraulic circuit body on the transmission casing by way of the lift arm support body, it is sufficient to perform the sealing of a mounting surface of the lift arm support body to the transmission casing at one portion and, at the same time, a conventional sealing method can b adopted.

Further, since the lower portion of the valve cover body is arranged in the inside of the transmission casing, it is possible to set a height above the ground of the hydraulic circuit body at a low level and hence, it is possible to ensure the large degree of freedom in designing a mounting height of a driver's seat which is arranged right above the hydraulic circuit body.

(6) According to the sixth aspect of the present invention, a lift arm is hydraulically controllable by a hydraulic control valve by way of a hydraulic circuit body, a valve cover body is mounted on the hydraulic circuit body, the hydraulic control valve is housed in the inside of the valve cover body, a sub spool is interposed between a spool which is mounted in the hydraulic control valve and a spool actuator which is arranged outside the valve cover body and actuates the spool, and the sub spool is configured such that a sealing member having the sealing structure is mounted in the valve cover body, a sub spool projecting hole is formed in the sealing member, and the sub spool is arranged in the sub spool projecting hole in a penetrating manner.

In this manner, by mounting the sealing member having the sealing structure to the valve cover body, by forming the sub spool projecting hole in the sealing member, and by allowing the sub spool to penetrate the sub spool projecting hole, and by interposing the sub spool between the spool provided to the hydraulic control valve and the spool actuator, even when the accuracy of concentricity of the spool and the sub spool projecting hole is made more or less offset due to a mounting error of the hydraulic control valve, it is possible to sufficiently ensure the slide operation of the sub spool in the sub spool projecting hole and hence, it is possible to surely transmit an actuation force of the spool actuator to the spool by way of the sub spool.

Accordingly, it is possible to favorably ensure the hydraulic control performed by the hydraulic control valve.

(7) According to the seventh aspect of the present invention, at least one of a contact surface of the spool with the sub spool or a contact surface of the sub spool with the spool is formed in an arcuate surface which bulges outwardly.

By forming the arcuate surface which bulges outwardly on either one of the respective contact surfaces of the spool and the sub spool, even when the accuracy of concentricity of the spool and the sub spool projecting hole is made more or less offset due to a mounting error of the hydraulic control valve, it is possible to surely transmit an actuation force of the spool actuator from the sub spool to the spool by way of the contact surfaces and hence, it is possible to ensure the hydraulic control performed by the hydraulic control valve in a more favorable manner.

DETAILED DESCRIPTION OF THE INVENTION

Figure 1:
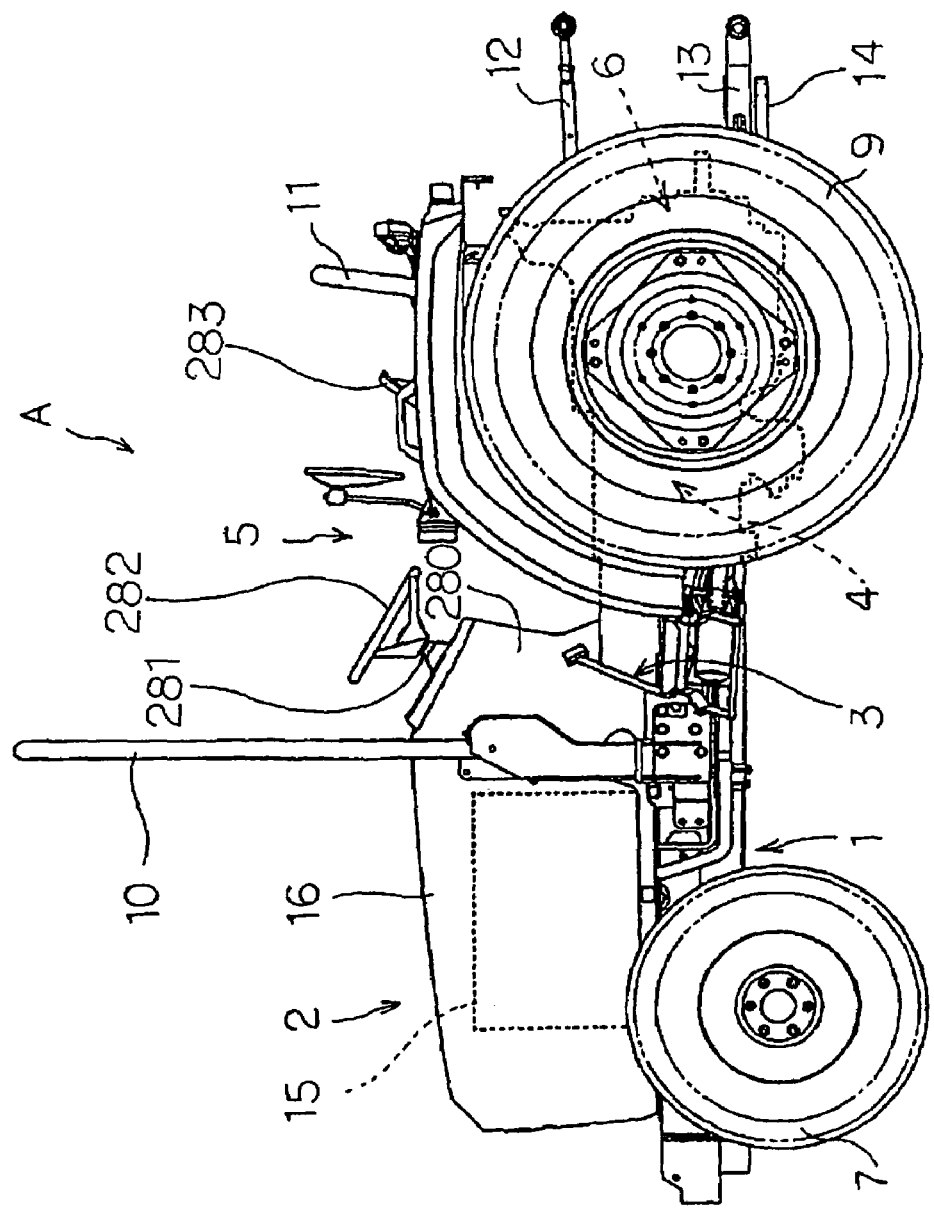
FIG. 1 is a side view of a tractor according to the present invention.

Symbol A shown in FIG. 1 indicates a tractor according to the present invention. The tractor A is configured such that a prime mover 2 is mounted on a body frame 1, a transmission part 4 is interlockingly connected to the prime mover 2 by way of a clutch part 3, a driving part 5 is arranged above the transmission part 4, a PTO transmission portion 6 is detachably and interlockingly mounted on a rear portion of the transmission part 4, a pair of left and right front wheels 7, 7 are interlockingly connected to a lower portion of the body frame 1 by way of front axle casings (not shown in the drawing), and a pair of left and right rear wheels 9, 9 are interlockingly connected to the transmission part 4 by way of rear axle casings 8,8. Numeral 10 indicates a front guard frame, numeral 11 indicates a rear guard frame, numeral 12 indicates a top link which serves for connecting a working machine such a rotary tiller or the like, numeral 13 indicates a lower link which serves for connecting the working machine, and numeral 14 indicates a connection member of the working machine for the trailer or the like.

Hereinafter, the constitutions of the above-mentioned [prime mover 2], [clutch part 3], [transmission part 4], [driving part 5] and [PTO transmission portion 6] are explained in a specific manner in this order.

[Prime Mover 2]

The prime mover 2 is constituted such that, as shown in FIG. 1, an engine 15 or the like is mounted on the body frame 1 and the engine 15 is covered with a hood 16 which can be opened and closed.

[The Clutch Part 3]

The clutch part 3 is configured such that, as shown in FIG. 2 to FIG. 4 and FIG. 6, an inner-and-outer double drive shaft body 18 which extends in the fore-and-aft direction is rotatably supported in the inside of a clutch housing 17, and the inner-and-outer double drive shaft body 18 is constituted of an inner drive shaft 19 which extends in the fore-and-aft direction and a cylindrical outer drive shaft 20 which is rotatably fitted on an outer periphery of the inner drive shaft 19.

Here, a proximal end portion (a front end portion) of the inner drive shaft 19 which constitutes one shaft is interlockingly connected with the engine 15 by way of a traveling clutch 21, while a distal end portion (a rear end portion) of the inner drive shaft 19 is interlockingly connected with a traveling-system transmission mechanism 51 described later. On the other hand, a proximal end portion (a front end portion) of the outer drive shaft 20 which constitutes another shaft is interlockingly connected with the engine 15 by way of a PTO clutch 22, while a distal end portion (a rear end portion) of the outer drive shaft 20 is interlockingly connected with a PTO-system transmission mechanism 52 described later.

Here, to a rear end peripheral portion of the clutch housing 17, a front end peripheral portion of a main transmission casing 53 of the transmission part 4 described later is detachably connected. The above-mentioned inner-and-outer double drive shaft body 18 has a distal end portion thereof pivotally supported by a bearing 24 which is arranged on a front portion inside the clutch housing 17 and a rear end portion thereof pivotally supported by a bearing 25 which is arranged on a front portion inside the main transmission casing 53.

Further, on an inner peripheral portion of a rear end of the clutch housing 17, a rear wall 27 having an opening portion 26 at a center portion thereof is formed and a cylindrical support body 28 which extends in the fore-and-aft direction is mounted on the rear wall 27 in a state that the cylindrical support body 28 passes through the opening portion 26, wherein the cylindrical support body 28 serves to support an outer peripheral surface of the midst portion of the inner-and-outer double drive shaft body 18.

Further, with respect to the cylindrical support body 28, a front portion 28a thereof which is positioned in the inside of the clutch housing 17 is formed in a state that the front portion 28a has a narrow diameter, while a rear portion 28b thereof which is positioned in the inside of the main transmission casing 53 is formed in a state the rear portion 28b has an enlarged diameter. Further, a mounting flange member 28c is formed on an outer peripheral surface of the rear portion 28b, the mounting flange member 28c is brought into contact with a rear surface of the rear wall 27 of the clutch housing 17 from behind, and the mounting flange member 28c is mounted on the rear wall 27 by a mounting bolt 29.

[Inner Drive Shaft 19]

The inner drive shaft 19 is formed as a two-split body which is constituted of a front divided drive shaft member 30 and a rear divided drive shaft member 31, and both divided drive shaft members 30, 31 are interlockingly connected with each other in the inside of the outer drive shaft 20. Here, a dividing position (interlocking connecting position) of the front divided drive shaft member 30 and the rear divided drive shaft member 31 is arranged in the vicinity of a connecting portion of the clutch housing 17 and the main transmission casing 53, that is, in the inside of the rear portion 28b of the cylindrical support body 28.

Further, a distal end portion of the front divided drive shaft member 30 and a proximal end portion of the rear divided drive shaft member 31 are detachably and interlockingly connected with each other using spigot fitting engagement.

That is, while a fitting projecting member 30a is formed on a distal end surface of the front divided drive shaft member 30 in a state that the fitting projecting member 30a projects rearwardly, a proximal-end-side fitting recessed portion 31a is formed on a proximal end surface of the rear divided drive shaft member 31. Then, the fitting projecting member 30a is fitted into the proximal-end-side fitting recessed portion 31a in spigot engagement and, at the same time, a cylindrical connecting body 32 which has an axis thereof directed in the fore-and-aft direction is fitted into spline grooves 30b formed in an outer peripheral surface of the distal end portion of the front divided drive shaft member 30 and spline grooves 31b formed in an outer peripheral surface of the proximal end portion of the rear divided drive shaft member 31.

[Outer Drive Shaft 20]

The outer drive shaft 20 is formed in a state that a front portion 20a thereof has a small diameter in conformity with an outer peripheral surface of the inner drive shaft 19 and a rear portion 20b thereof has a large diameter in conformity with an outer peripheral surface of the cylindrical connection body 32. Bearings 33, 34 are interposed between an outer peripheral surface of the rear portion 20b of the outer drive shaft 20 and an inner peripheral surface of the rear portion of a rear portion 28b of the cylindrical support body 28.

Further, a distal end portion of the outer drive shaft 20 extends rearwardly than a rear end of the cylindrical support body 28 and a PTO drive gear 20c is integrally formed on an outer peripheral surface of the outer drive shaft 20. Numeral 35 indicates a PTO drive gear support bearing.

In this manner, the inner drive shaft 19 is formed such that the inner drive shaft 19 is divided into the front divided drive shaft member 30 and the rear divided drive shaft member 31 and both divided drive shaft members 30, 31 are interlockingly connected with each other in the inside of the outer drive shaft 20. Accordingly, compared to a prior art in which a distal end portion of an inner drive shaft is extended rearwardly than a distal end portion of an outer drive shaft and is interlockingly connected with a proximal end portion of a PTO-system input shaft coaxially by way of a cylindrical shaft coupling in an abutted state, even when the clutch housing 17 and the main transmission casing 53 are connected in the fore-and-aft direction and the inner-and-outer double drive shaft body 18 is allowed to pass through the inside of the clutch housing 17 and the main transmission casing 53, it is possible to eliminate a drawback that the main transmission casing 53 is largely prolonged in the fore-and-aft direction.

Further, an assembling operation to connect the clutch housing 17 and the main transmission casing 53 by assembling and a maintenance operation which is performed by releasing the connection can be performed easily.

Still further, since the division position of the front divided drive shaft member 30 and the rear divided drive shaft member 31 of the inner drive shaft 19 is arranged in the vicinity of the connecting portion of the clutch housing 17 and the main transmission casing 53, the main transmission casing 53 can be contracted in the fore-and-aft direction whereby the body can be made compact and, at the same time, an assembled unit of the main transmission casing 53 can be shortened in the fore-and-aft direction whereby the transportation cost of the assembled unit can be reduced whereby it is possible to bring a large number of units at a time by making use of outsourcing.

Here, the fitting projecting member 30a formed on the distal end portion of the front divided drive shaft member 30 is fitted into the proximal-end-side fitting recessed portion 31a formed in the proximal end portion of the rear divided drive shaft member 31 using the spigot joint fitting and hence, the front divided drive shaft member 30 and the rear divided drive shaft member 31 are detachably interlockingly connected with each other. Accordingly, it is possible to interlockingly connect the front divided drive shaft member 30 and the rear divided drive shaft member 31 which are formed in a two-split structure by assembling these members 30, 31 with high accuracy.

Further, a traveling cylindrical operating body 36 is fitted on an outer peripheral surface of the outer drive shaft 20 as well as on an outer peripheral surface of the cylindrical support body 28 in a slidable manner in the fore-and-aft direction, and a proximal end portion of a traveling clutch operating lever 37 is interlockingly connected with a rear portion of the traveling cylindrical operating body 36. Further, a clutch operating member 36a is mounted on a front end peripheral portion of the traveling cylindrical operating body 36, and the clutch operating member 36a is arranged close to an operation receiving arm 21a of a traveling clutch 21 in an opposed manner. Numeral 38 indicates a lever support shaft.

Due to such a constitution, when the traveling clutch operating lever 37 is rotatably manipulated, the traveling cylindrical operating body 36 is slidably moved frontwardly, the clutch operating member 36a pushes the operation receiving arm 21a so as to rotate the operation receiving arm 21a whereby the traveling clutch 21 performs the power transmission disconnecting operation.

Further, a PTO cylindrical operating body 39 is fitted on an outer peripheral surface of the traveling cylindrical operating body 36 in a slidable manner in the fore-and-aft direction, and a proximal end portion of a PTO clutch operating lever 40 is interlockingly connected with a rear portion of the PTO cylindrical operating body 39. Further, a clutch operating member 39a is mounted on a front end peripheral portion of the PTO cylindrical operating body 39, and the clutch operating member 39a is arranged close to an operation receiving arm 22a of a PTO clutch 22 in an opposed manner. Numeral 41 indicates a lever support shaft.

Due to such a constitution, when the PTO clutch operating lever 40 is rotatably manipulated, the PTO cylindrical operating body 39 is slidably moved frontwardly, the clutch operating member 39a pushes the operation receiving arm 22a so as to rotate the operation receiving arm 22a whereby the PTO clutch 22 performs the power cutting operation.

[Transmission Part 4]

Figure 2:
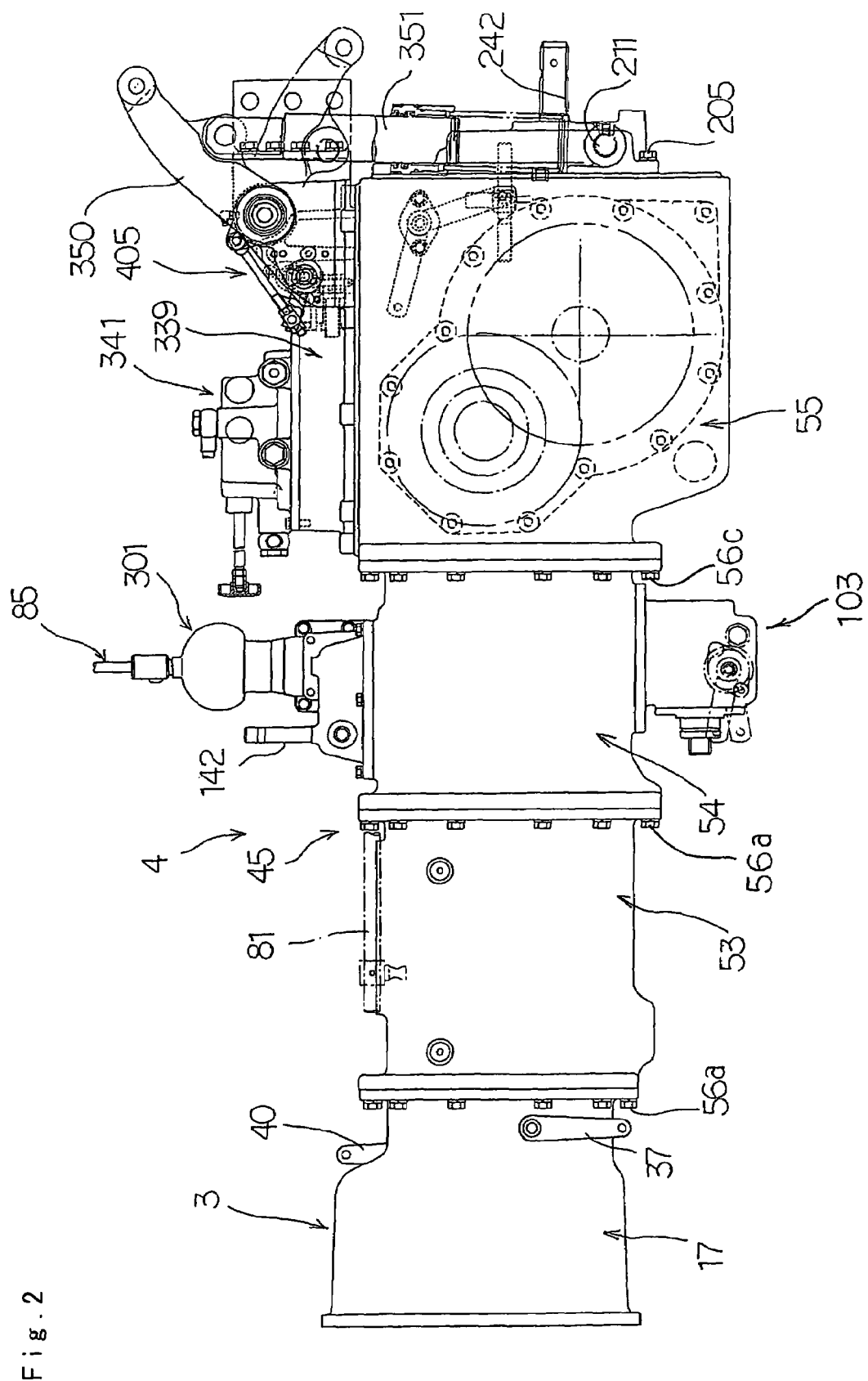
FIG. 2 is a side view of a clutch part and a transmission part formed on the tractor.
Figure 3:
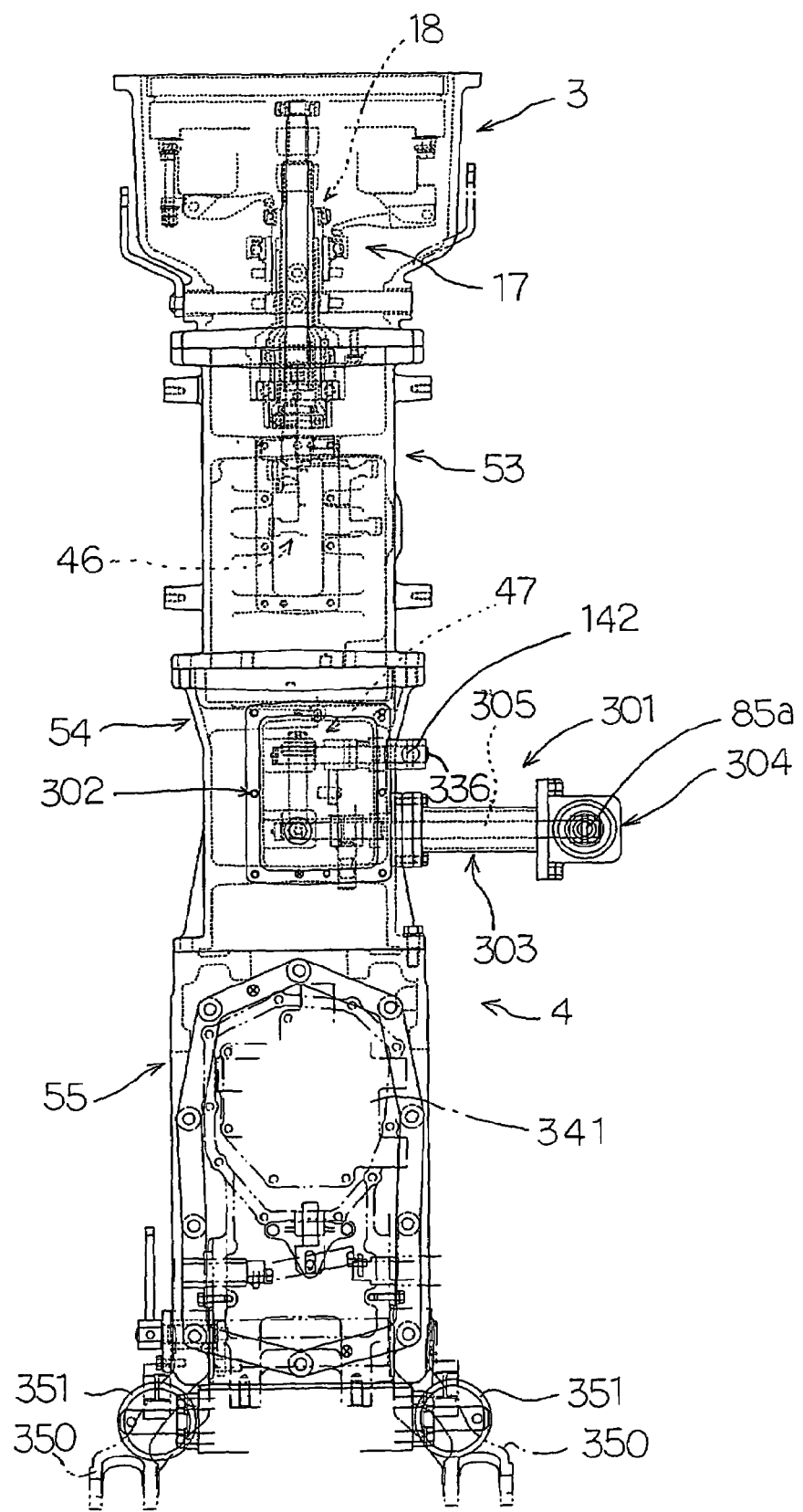
FIG. 3 is a plan view of the clutch part and the transmission part.
Figure 4:
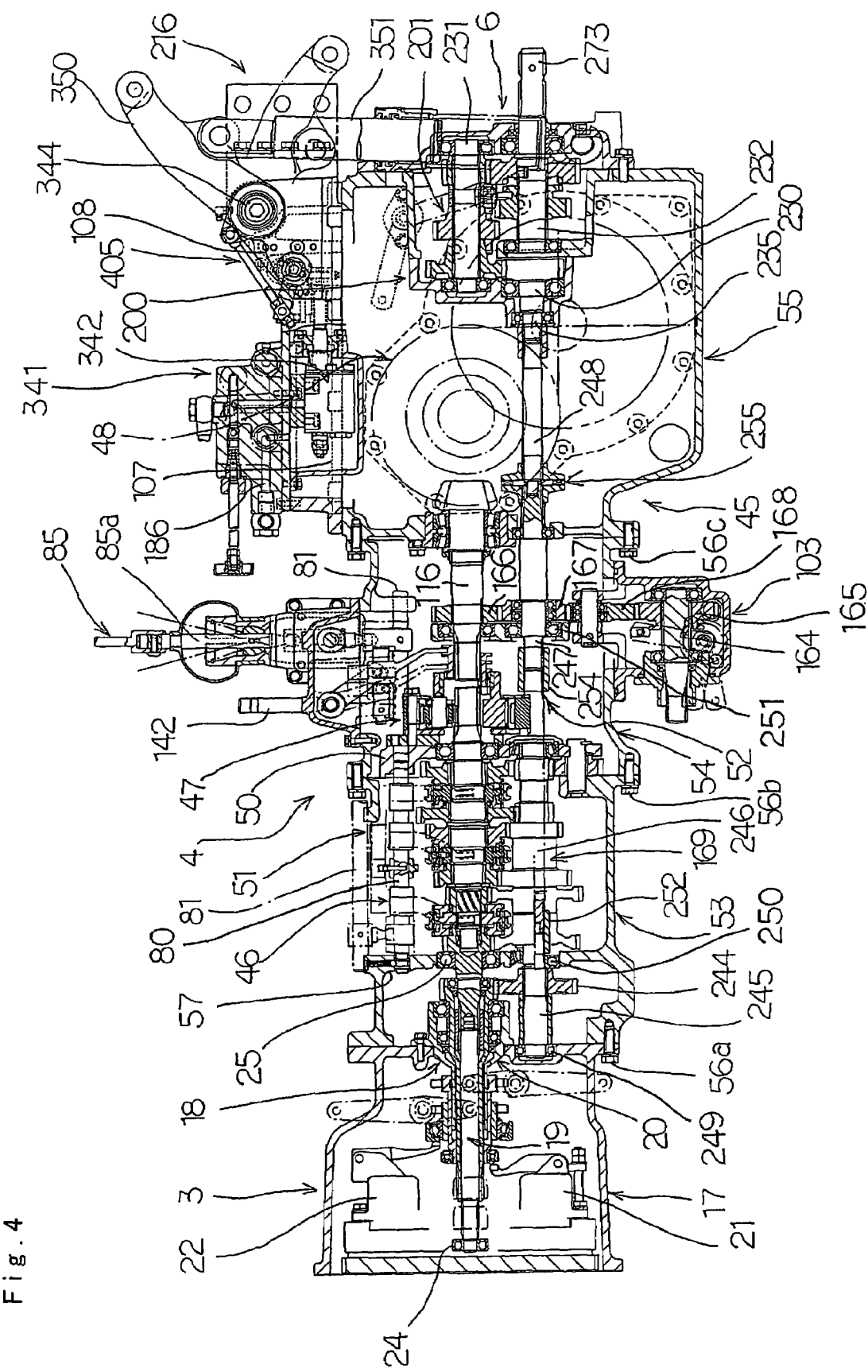
FIG. 4 is an explanatory cross-sectional side view of the clutch part and the transmission part.

The transmission part 4 is, as shown in FIG. 2 to FIG. 4, configured such that, in the inside of a transmission casing 45 which extends in the fore-and-aft direction and is formed in a cylindrical shape, a main transmission mechanism 46, a sub transmission mechanism 47 and a differential mechanism 48 are arranged sequentially in the front-to-rear direction thus forming a traveling-system power-transmission mechanism 51 which can perform the main transmission and the sub transmission. Further, a PTO-system power-transmission mechanism 52 is interposed between the outer drive shaft 20 and the PTO transmission portion 6 described later.

Further, the transmission casing 45 is divided in three to a main transmission casing 53 which incorporates the main transmission mechanism 46 therein, a sub transmission casing 54 which incorporates the sub transmission mechanism 47 therein, and a differential gear casing 55 which incorporates the differential mechanism 48 therein. A front end peripheral portion of the main transmission casing 53 is detachably connected to a rear end peripheral portion of the above-mentioned clutch housing 17 using connecting bolts 56a, a front end peripheral portion of the sub transmission casing 54 is detachably connected to a rear end peripheral portion of the main transmission casing 53 using connecting bolts 56b, and a front end peripheral portion of the differential gear casing 55 is detachably connected to a rear end peripheral portion of the sub transmission casing 54 using connecting bolts 56c.

Hereinafter, the respective constitutions of the above-mentioned (main transmission casing 53), (main transmission mechanism 46), (sub transmission casing 54), (sub transmission mechanism 47), (differential gear casing 55), and (differential mechanism 48) are explained in this order.

(Main Transmission Casing 53)

Figure 7:
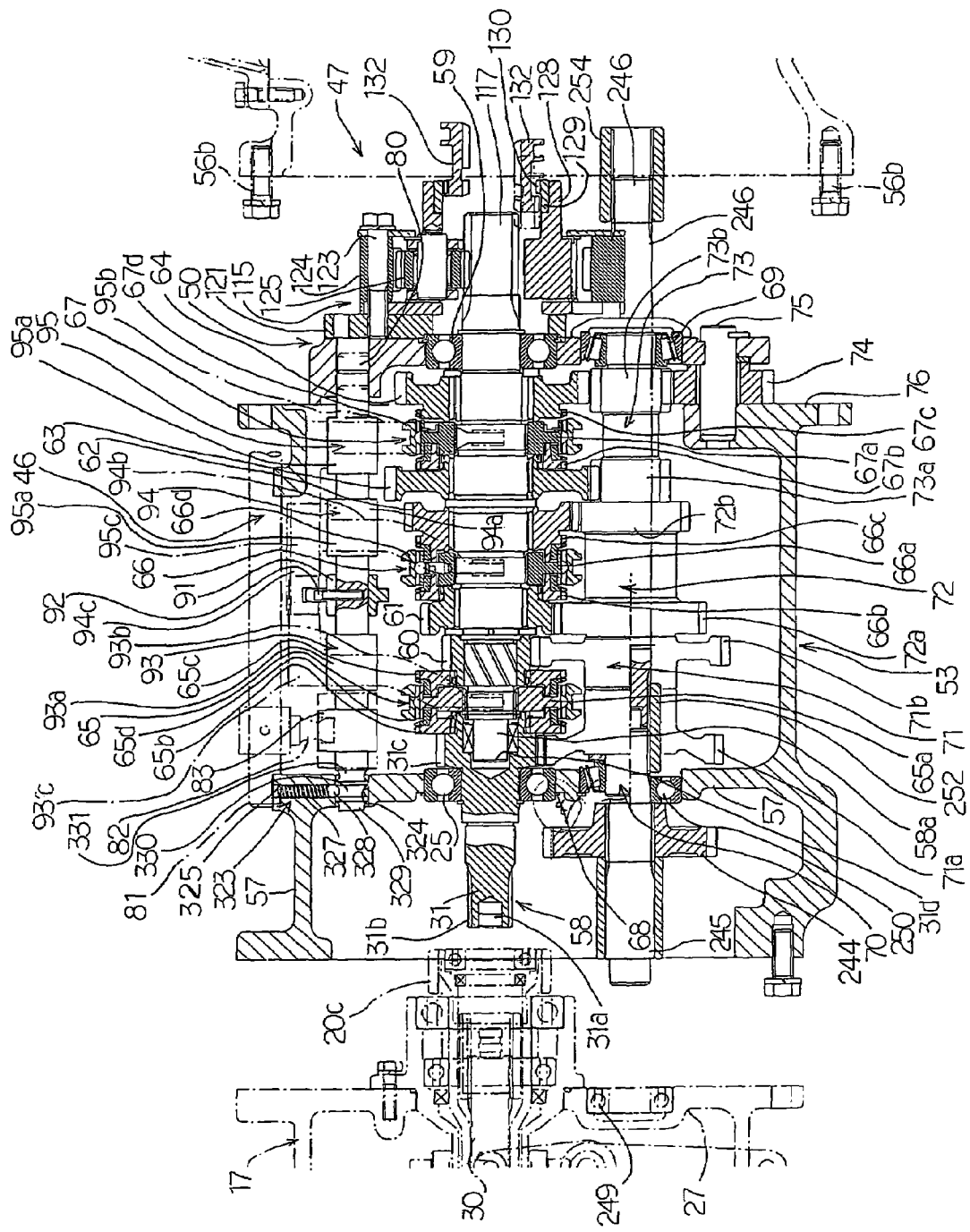
FIG. 7 is an explanatory cross-sectional side view of a main transmission portion of the transmission part.
Figure 8:
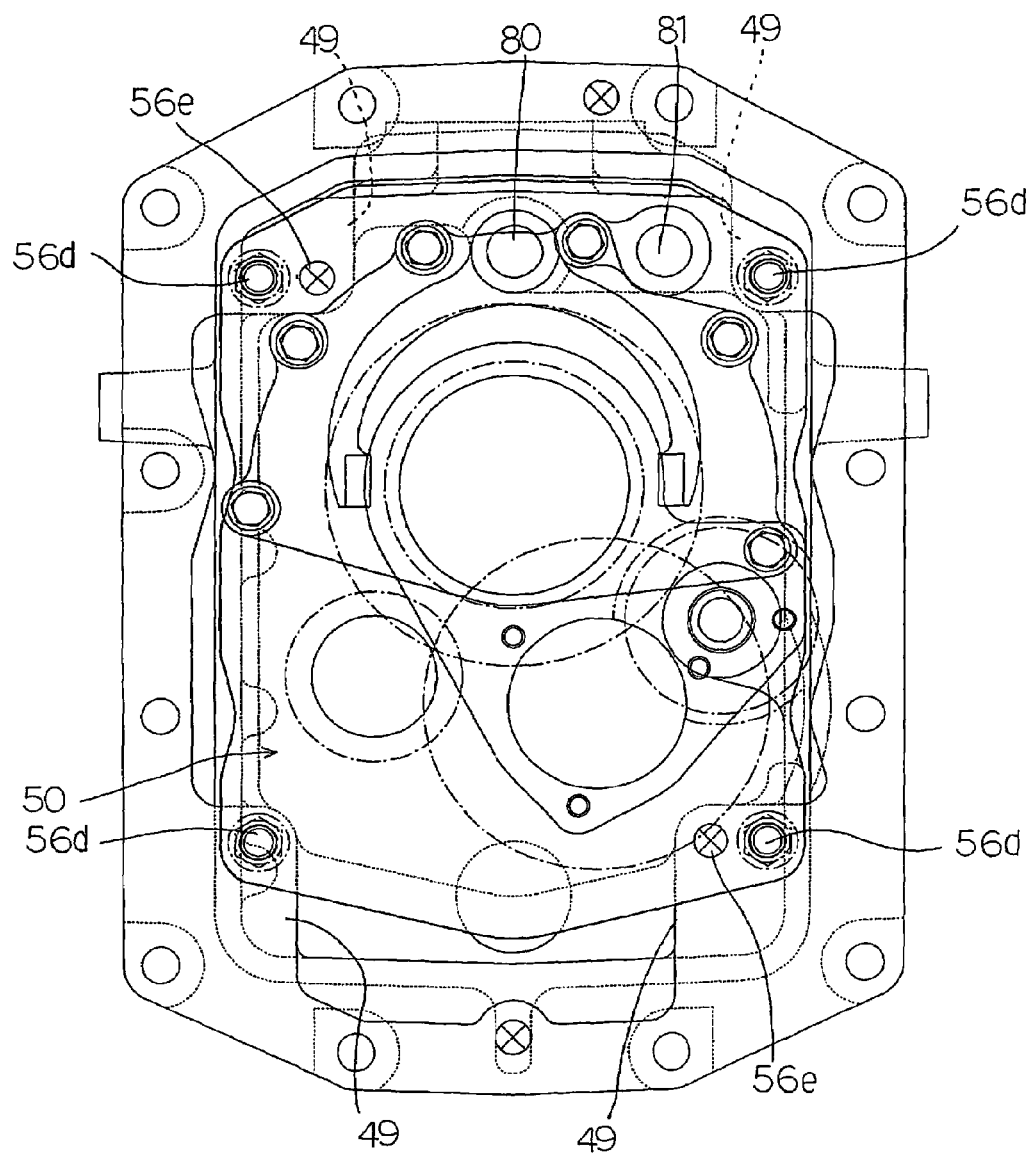
FIG. 8 is a back view of the main transmission portion.

The main transmission casing 53 is, as shown in FIG. 7 and FIG. 8, formed in a cylindrical shape which extends in the fore-and-aft direction, an inner support wall 57 is integrally formed on a front inner peripheral surface thereof, wall receiving seats 49, 49, 49, 49 are respectively formed in a bulging manner on upper, lower, left and right side portions of a rear inner peripheral portion thereof, and a shaft support wall forming body 50 is detachably mounted on rear surfaces of these wall receiving seats 49, 49, 49, 49 using connecting bolts 56d, 56d, 56d, 56d, whereby a rear end, surface of the main transmission casing 53 is brought into face contact with a front end surface of the sub transmission casing 54 without interposing the shaft support wall forming body 50 and is detachably connected to the front end surface of the sub transmission casing 54 using connecting bolts 56b. Numeral 56e indicates a positioning projecting member.

Here, the shaft support wall forming body 50 forms an outer peripheral portion thereof in conformity with a shape of an inner peripheral surface of a rear end portion of the main transmission casing 53 and, at the same time, is formed in a slightly compact shape to be arranged inwardly than an inner peripheral portion of a rear end portion of the main transmission casing 53 whereby a rear end surface of the main transmission casing 53 can be brought into face contact with a front end surface of the sub transmission casing 54.

Further, the main transmission mechanism 46 is interposed between the inner support wall 57 and the shaft support wall forming body 50, wherein the main transmission mechanism 46 is configured to perform the frontward transmission manipulation in plural stages (five stages in this embodiment) and a rearward changeover manipulation.

In this manner, the shaft support wall forming body 50 is detachably mounted on the inner peripheral portion of the rear end portion of the main transmission casing 53. Accordingly, in assembling the transmission casing 45, the sub transmission mechanism 47 described later is preliminarily assembled in the inside of the sub transmission casing 54, the differential mechanism 48 described later is assembled in the inside of the differential gear casing 55, and the main transmission mechanism 46 is assembled in the inside of the main transmission casing 53 by way of the shaft support wall forming body 50. Thereafter, the rear end surface of the main transmission casing 53 is brought into face contact with and is connected to the front end surface of the sub transmission casing 54 without by way of the shaft support wall forming body 50. Accordingly, it is possible to easily and surely assemble the transmission casing 45 thus realizing the efficient assembling operation of the transmission casing 45.

Here, since the sealing property between the end surfaces of the sub transmission casing 54 and the main transmission casing 53 can be easily ensured, the leaking of oil can be easily prevented.

(Main Transmission Mechanism 46)

Figure 10:
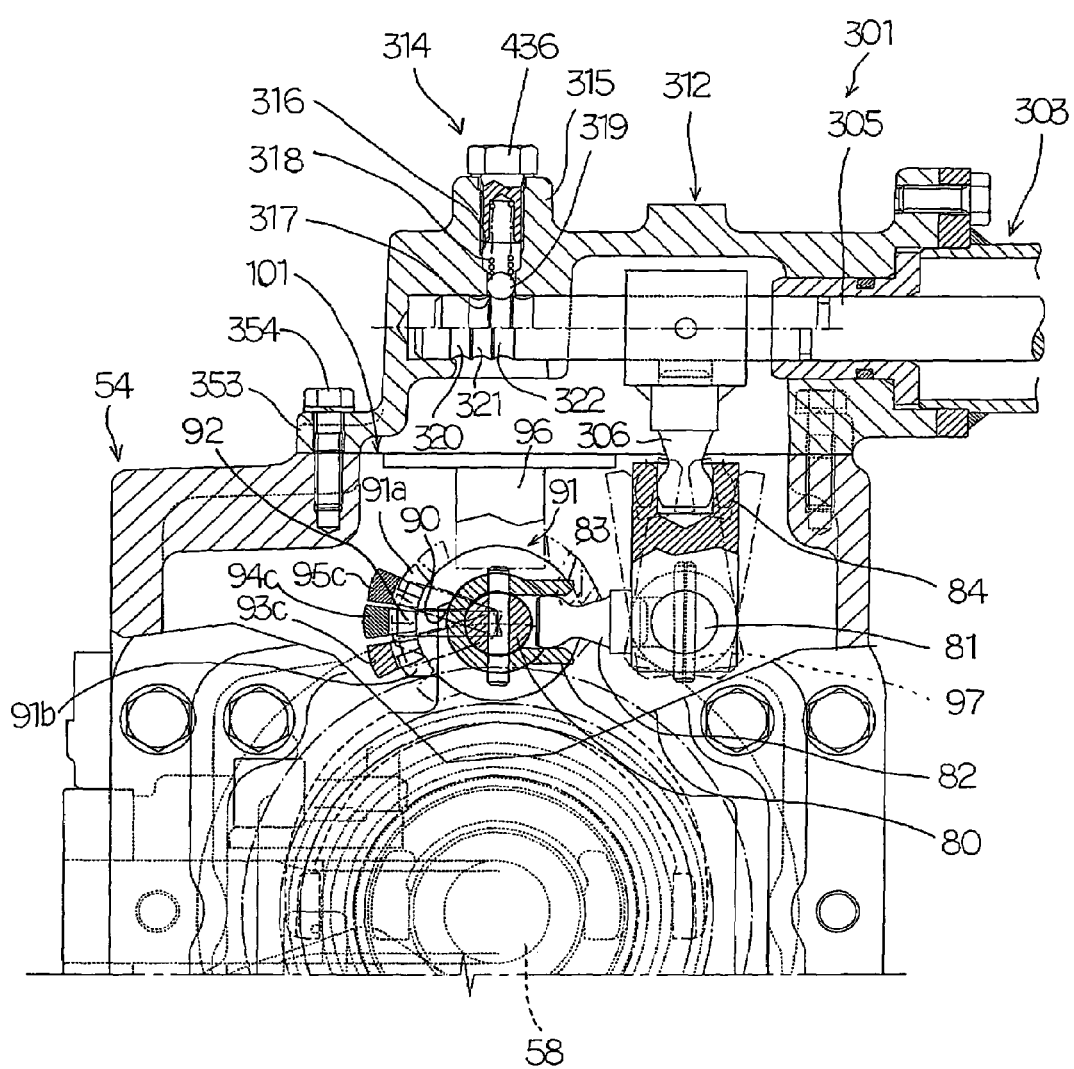
FIG. 10 is an explanatory enlarged cross-sectional back view of an upper portion of the sub transmission portion.

The main transmission mechanism 46 is configured as shown in FIG. 7 and FIG. 10. A distal end portion (a rear end portion) of the rear divided drive shaft member 31 is supported on a center portion of the inner support wall 57 by way of the bearing 25. A fifth transmission gear 31c is integrally formed on an outer peripheral surface of a distal end portion of the rear divided drive shaft member 31 which is positioned behind the bearing 25. A front-end-side fitting recessed portion 31d is formed on a rear end surface of the rear divided drive shaft member 31. A fitting projecting member 58a which is formed on a main-transmission main shaft 58 extending in the fore-and-aft direction in a state that the fitting projecting member 58a projects frontwardly than a proximal end surface (a front end surface) of the main-transmission main shaft 58 is fitted into the front-end-side fitting recessed portion 31d in a state that the fitting projecting member 58a is rotatable about an axis thereof. A distal end portion (a rear end portion) of the main-transmission main shaft 58 is supported on a center portion of the shaft support wall forming body 50 by way of a bearing 59 in a state that the distal end portion is rotatable about an axis thereof.

Further, on the main-transmission main shaft 58, a fourth transmission gear 60, a third transmission gear 61, a second transmission gear 62 and a first transmission gear 63 and a rearward changeover gear 64 are sequentially mounted from the proximal end portion side to the distal end portion side in a state that these gears are arranged in a spaced-apart manner in the fore-and-aft direction and coaxially and are rotatable about an outer peripheral surface of the main-transmission main shaft 58.

Further, these gears are rotatably mounted on an outer peripheral surface of the main-transmission main shaft 58.

Further, on the main-transmission main shaft 58, a third speed-change body 65 which is arranged between the fifth transmission gear 31c and the fourth transmission gear 60, a second speed-change body 66 which is arranged between the third transmission gear 61 and the second transmission gear 62, and a first speed-change body 67 which is arranged between the first transmission gear 63 and the rearward changeover gear 64 are mounted.

Here, the respective speed-change bodies 65, 66, 67 include shaft-side interlocking connection members 65a, 66a, 67a which are interlockingly connected with the main-transmission main shaft 58, front-and-rear gear-side interlocking connection members 65b, 65c, 66b, 66c, 67b, 67c which are interlockingly connected with the respective gears which are arranged close to each other in the fore-and-aft direction, and slide connection members 65d, 66d, 67d which are slidably arranged in the axial direction in spline fitting between the respective shaft-side interlocking connection members 65a, 66a, 67a and the respective gear-side interlocking connection members 65b, 65c, 66b, 66c, 67b, 67c.

Further, the respective slide connection members 65d, 66d, 67d are slidably manipulated to any one of a neutral position where the respective slide connection members 65d, 66d, 67d are positioned on the respective shaft-side interlocking connection members 65a, 66a, 67a, a front slide transmission position where the respective slide connection members 65d, 66d, 67d are slid and are positioned between the respective shaft-side interlocking connection members 65a, 66a, 67a and the front gear-side interlocking connection members 65b, 66b, 67b and both members are interlockingly connected with each other, and a rear slide transmission position where the respective slide connection members 65d, 66d, 67d are slid and are positioned between the respective shaft-side interlocking connection members 65a, 66a, 67a and the rear gear-side interlocking connection members 65c, 66c, 67c and both members are interlockingly connected with each other.

Further, between the inner support wall 57 and the above-mentioned shaft support wall forming body 50, a main transmission sub shaft 70 which extends in the fore-and-aft direction is supported by way of front and rear bearings 68, 69. On an outer peripheral surface of the main transmission sub shaft 70, first, second and third transmission gear bodies 71, 72, 73 are coaxially and rotatably mounted.

Further, a front gear 71a and a rear gear 71b which are integrally formed with the first transmission gear body 71 are respectively meshed with the fifth transmission gear 31c and the second transmission gear 62, a front gear 72a and a rear gear 72b which are integrally formed with the second transmission gear body 72 are respectively meshed with the third transmission gear 61 and the second transmission gear 62 and, further, a front gear 73a which is integrally formed with the third transmission gear body 73 is meshed with the first transmission gear 63. On the other hand, a rear gear 73b which is integrally formed with the third transmission gear body 73 is meshed with a rearward changeover gear 64 by way of a counter gear 74 which is pivotally supported on the shaft support wall forming body 50. Numeral 75 indicates a counter gear support shaft, and numeral 76 indicates a shaft support boy formed in the inside of the main transmission casing 53.

Further, between the inner support wall 57 and the above-mentioned shaft support wall forming body 50, as shown in FIG. 4, FIG. 5 and FIG. 7 to FIG. 10, a slide body support shaft 80 which extends in the fore-and-aft direction is slidably arranged at a position right above the main-transmission main shaft 58 and, at the same time, a lever interlocking shaft 81 which constitutes an interlocking shaft extending in the fore-and-aft direction is slidably arranged in the fore-and-aft direction in parallel with the slide body support shaft 80 at a right side position of the slide body support shaft 80. A distal end portion of an engaging member 82 which is formed on the lever interlocking shaft 81 such that the engaging member 82 projects leftwardly from a front portion of the lever interlocking shaft 81 is engaged with an engaging member 83 which is formed on a front portion of the slide body support shaft 80. On the other hand, an operation receiving member 84 is formed on a rear end portion of the lever interlocking shaft 81 which extends into the inside of the sub transmission casing 54, and a lever interlocking mechanism 300 is interposed between the operation receiving member 84 and a main transmission lever 85.

Here, the constitutions of the main transmission lever 85 and the lever interlocking mechanism 300 are explained in the explanation of the sub transmission mechanism 47 described later for the sake of convenience.

Further, as shown in FIG. 10, a slide restricting body 91 which has a side opening portion 90 and is formed in a C shape as viewed from back surface is fitted on a midst portion of the slide body support shaft 80 and, at the same time, a slide operating member 92 projects in the radial direction from the slide body support shaft 80 through the side opening portion 90.

Further, first, second and third slide bodies 95, 94, 93 which extend from the rear side to the front side are slidably mounted on the slide body support shaft 80 in the axial direction and, at the same time, the third slide body 93 is arranged in front of the slide restricting body 91 and the first and second slide bodies 95, 94 are arranged behind the slide restricting body 91.

Still further, the respective slide bodies 95, 94, 93 include boss portions 95a, 94a, 93a which are slidably fitted on the slide body support shaft 80, shift forks 95b, 94b, 93b which are formed on the respective boss portions 95a, 94a, 93a in a state that the shift forks 95b, 94b, 93b extend downwardly at left and right sides, and slide operation receiving members 95c, 94c, 93c which are formed on the respective boss portions 95a, 94a, 93a in a state that slide operation receiving members 95c, 94c, 93c extend toward the slide restricting body 91 from the respective boss portions 95a, 94a, 93a.

Further, the respective shift forks 95b, 94b, 93b of the first, second and third slide bodies 95, 94, 93 are interlockingly connected with the slide connection members 67d, 66d, 65d of the above-mentioned first, second and third speed-change bodies 67, 66, 65.

Further, with respect to the respective slide operation receiving members 95c, 94c, 93c of the first, second and third slide bodies 95, 94, 93, by rotating the slide operating member 92 and the slide restricting body 91 in the desired direction by rotating the slide body support shaft 80 about an axis thereof, the slide operating member 92 is engaged with one desired slide operation receiving member and the slide operating member 92 is slidably moved in an interlocking manner with the fore-and-aft slide movement of the slide body support shaft 80. At the same time, at least one of the restricting members 91a, 91b which are formed on the slide restricting body 91 in a projecting manner is engaged with another two slide operation receiving members thus preventing the both slide operation receiving members from performing the slide operation which is interlocked with the fore-and-aft slide movement of the slide body support shaft 80. Numeral 96 indicates a restricting projecting member which is mounted on a ceiling portion 54c of the sub transmission casing 54 in a vertically downwardly extending manner for restricting the movement of the slide restricting body 91 in the axial direction.

The main transmission mechanism 46 has the above-mentioned constitution and the manner of transmission manipulation (a first transmission manipulation to a fifth transmission manipulation and the rearward changeover manipulation) is explained hereinafter.

(First Transmission Manipulation)

The main transmission lever 85 is rotatably manipulated in the rearward direction in a state that the main transmission lever 85 is erected substantially vertically, and a rotating manipulation force is transmitted to the slide body support shaft 80 through a path of an operating member 85a formed on a lower end portion of the main transmission lever 85→the operation receiving member 84→the lever interlocking shaft 81→the engaging member 82→engaging member 83→the slide body support shaft 80, whereby the slide body support shaft 80 is slidably moved in the frontward direction.

Then, the slide movement force in the frontward direction of the slide body support shaft 80 is transmitted to the shift fork 95b through a path of the slide operating member 92→the slide operation receiving member 95c of the first slide body 95→the boss portion 95a→shift fork 95b. Accordingly, the slide connection member 67d of the first speed-change body 67 which is interlockingly connected with the shift fork 95b is slidably moved from the neutral position to the front slide transmission position thus establishing a state in which the shaft-side interlocking connection member 67a and the front-gear-side interlocking connection member 67b are interlockingly connected with each other.

As a result, the power which is transmitted to the inner drive shaft 19 from the engine 15 is transmitted to the main-transmission main shaft 58 through a path of the front divided drive shaft member 30→the rear divided drive shaft member 31→the fifth transmission gear 31c→the front gear 71a of the first transmission gear body 71→the main transmission sub shaft 70→the front gear 73a of the third transmission gear body 73→the first transmission gear 63→the front-gear-side interlocking connection member 67b of the first speed-change body 67→the slide connection member 67d→the shaft-side interlocking connection members 67a→the main-transmission main shaft 58 whereby the first transmission is performed.

Here, the slide operating member 92 is engaged with the slide operation receiving member 95c of the first slide body 95 and, at the same time, the slide restricting members 91a, 91b of the slide restricting body 91 are engaged with the slide operation receiving members 94c, 93c of the second and third slide bodies 94, 93 whereby the movements of both slide bodies 94, 93 are restricted.

(Second Transmission Manipulation)

The main transmission lever 85 is rotatably manipulated in the rightward direction thus rotating the operating member 85a formed on a lower end portion of the main transmission lever 85 in the leftward direction using a tilting support member 87 as a fulcrum, and the rotating force is transmitted to the slide body support shaft 80 through a path of the operation receiving member 84→the lever interlocking shaft 81→the engaging member 82→engaging member 83→the slide body support shaft 80, whereby the slide body support shaft 80 is rotated in the clockwise direction in a back view shown in FIG. 10 and, at the same time, the slide restricting body 91 is also rotated in the clockwise direction by way of the slide operating member 92.

Subsequently, the main transmission lever 85 which is rotatably manipulated in the rightward direction is further rotated in the frontward direction so as to slide the slide body support shaft 80 in the rearward direction.

Then, the slide movement force in the rearward direction of the slide body support shaft 80 is transmitted to the shift fork 94b through a path of the slide operating member 92→the slide operation receiving member 94c of the second slide body 94→the boss portion 94a→the shift fork 94b. Accordingly, the slide connection member 66d of the second speed-change body 66 which is interlockingly connected with the shift fork 94b is slidably moved from the neutral position to the rear slide transmission position thus establishing a state in which the shaft-side interlocking connection member 66a and the back-gear-side interlocking connection member 66c are interlockingly connected with each other.

As a result, the power which is transmitted to the inner drive shaft 19 from the engine 15 is transmitted to the main-transmission main shaft 58 through a path of the front divided drive shaft member 30→the rear divided drive shaft member 31→the fifth transmission gear 31c→the front gear 71a of the first transmission gear body 71→the main transmission sub shaft 70→the rear gear 72b of the second transmission gear body 72→the second transmission gear 62→the rear-gear-side interlocking connection member 66c of the second speed-change body 66→the slide connection member 66d→the shaft-side interlocking connection members 66a→the main-transmission main shaft 58 whereby the second transmission is performed.

Here, the slide operating member 92 is engaged with the slide operation receiving member 94c of the second slide body 94 and, at the same time, the slide restricting member 91b of the slide restricting body 91 is engaged with the slide operation receiving members 95c, 93c of the first and third slide bodies 95, 93 whereby the movements of both slide bodies 95, 93 are restricted.

(Third Transmission Manipulation)

The main transmission lever 85 is rotatably manipulated in the rightward direction and also is rotated in the rearward direction to allow the slide body support shaft 80 to slide in the forward direction.

Then, the slide movement force in the frontward direction of the slide body support shaft 80 is transmitted to the shift fork 94b through a path of the slide operating member 92→the slide operation receiving member 94c of the second slide body 94→the boss portion 94a→the shift fork 94b. Accordingly, the slide connection member 66d of the second speed-change body 66 which is interlockingly connected with the shift fork 94b is slidably moved from the neutral position to the front slide transmission position thus establishing a state in which the shaft-side interlocking connection member 66a and the front-gear-side interlocking connection member 66b are interlockingly connected with each other.

As a result, the power which is transmitted to the inner drive shaft 19 from the engine 15 is transmitted to the main-transmission main shaft 58 through a path of the front divided drive shaft member 30→the rear divided drive shaft member 31→the fifth transmission gear 31c→the front gear 71a of the first transmission gear body 71→the main transmission sub shaft 70→the front gear 72a of the second transmission gear body 72→the third-transmission gear 61→the front-gear-side interlocking connection member 66b of the second speed-change body 66→the slide connection member 66d→the shaft-side interlocking connection members 66a→main-transmission main shaft 58 whereby the third transmission is performed.

Here, the slide operating member 92 is engaged with the slide operation receiving member 94c of the second slide body 94 and, at the same time, the slide restricting member 91b of the slide restricting body 91 is engaged with the slide operation receiving members 95c, 93c of the first and third slide bodies 95, 93 whereby the movements of both slide bodies 95, 93 are restricted.

(Fourth Transmission Manipulation)

The main transmission lever 85 is rotatably manipulated in the leftward direction thus rotating the operating member 85a formed on a lower end portion of the main transmission lever 85 in the rightward direction using the tilting support member 87 as a fulcrum, and the rotating force is transmitted to the slide body support shaft 80 through a path of the operation receiving member 84→the lever interlocking shaft 81→the engaging member 82→the engaging member 83→the slide body support shaft 80, whereby the slide body support shaft 80 is rotated in the counterclockwise direction in a back view shown in FIG. 10 and, at the same time, the slide restricting body 91 is also rotated in the counterclockwise direction by way of the slide operating member 92.

Subsequently, the main transmission lever 85 which is rotatably manipulated in the rightward direction is further rotated in the frontward direction so as to slide the slide body support shaft 80 in the rearward direction.

Then, the slide movement force in the rearward direction of the slide body support shaft 80 is transmitted to the shift fork 93b through a path of the slide operating member 92→the slide operation receiving member 93c of the third slide body 93→the boss portion 93a→the shift fork 93b. Accordingly, the slide connection member 65d of the third speed-change body 65 which is interlockingly connected with the shift fork 93b is slidably moved from the neutral position to the rear slide transmission position thus establishing a state in which the shaft-side interlocking connection member 65a and the back-gear-side interlocking connection member 65c are interlockingly connected with each other.

As a result, the power which is transmitted to the inner drive shaft 19 from the engine 15 is transmitted to the main-transmission main shaft 58 through a path of the front divided drive shaft member 30→the rear divided drive shaft member 31→the fifth transmission gear 31c→the rear gear 71b of the first transmission gear body 71→the fourth transmission gear 60→the rear-gear-side interlocking connection member 65c of the third speed-change body 65→the slide connection member 65d→the shaft-side interlocking connection members 65a→main-transmission main shaft 58 whereby the fourth transmission is performed.

Here, the slide operating member 92 is engaged with the slide operation receiving member 93c of the third slide body 93 and, at the same time, the restricting member 91a of the slide restricting body 91 is engaged with the slide operation receiving members 95c, 94c of the first and second slide bodies 95, 94 whereby the movements of both slide bodies 95, 94 are restricted.

(Fifth Transmission Manipulation)

The main transmission lever 85 is rotatably manipulated in the leftward direction and also is rotated in the rearward direction to allow the slide body support shaft 80 to slide in the forward direction.

Then, the slide movement force in the frontward direction of the slide body support shaft 80 is transmitted to the shift fork 95b through a path of the slide operating member 92→the slide operation receiving member 95c of the first slide body 95→the boss portion 95a→the shift fork 95b. Accordingly, the slide connection member 65d of the third speed-change body 65 which is interlockingly connected with the shift fork 95b is slidably moved from the neutral position to the front slide transmission position thus establishing a state in which the shaft-side interlocking connection member 65a and the front-gear-side interlocking connection member 65b are interlockingly connected with each other.

As a result, the power which is transmitted to the inner drive shaft 19 from the engine 15 is transmitted to the main-transmission main shaft 58 through a path of the front divided drive shaft member 30→the rear divided drive shaft member 31→the fifth transmission gear 31c→the front-gear-side interlocking connection member 65b of the third speed-change body 65→the slide connection member 65d→the shaft-side interlocking connection members 65a→main-transmission main shaft 58 whereby the fifth transmission is performed.

Here, the slide operating member 92 is engaged with the slide operation receiving member 93c of the second slide body 93 and, at the same time, the restricting member 91a of the slide restricting body 91 is engaged with the slide operation receiving members 95c, 94c of the first and second slide bodies 95, 94 whereby the movements of both slide bodies 95, 94 are restricted.

(Rearward Changeover Manipulation)

The main transmission lever 85 is rotatably manipulated in the forward direction in a state that the main transmission lever 85 is erected substantially vertically, and a rotating manipulation force is transmitted to the slide body support shaft 80 through a path of the operating member 85a formed on the lower end portion of the main transmission lever 85→the operation receiving member 84→the lever interlocking shaft 81→the engaging member 82→the engaging member 83→the slide body support shaft 80, whereby the slide body support shaft 80 is slidably moved in the rearward direction.

Then, the slide movement force in the rearward direction of the slide body support shaft 80 is transmitted to the shift fork 95b through a path of the slide operating member 92→the slide operation receiving member 95c of the first slide body 95→the boss portion 95a→shift fork 95b. Accordingly, the slide connection member 65d of the third speed-change body 65 which is interlockingly connected with the shift fork 95b is slidably moved from the neutral position to the rear slide transmission position thus establishing a state in which the shaft-side interlocking connection member 67a and the rear-gear-side interlocking connection member 67c are interlockingly connected with each other.

As a result, the power which is transmitted to the inner drive shaft 19 from the engine 15 is transmitted to the main-transmission main shaft 58 through a path of the front divided drive shaft member 30→the rear divided drive shaft member 31→the fifth transmission gear 31c→the front gear 71a of the first speed-change body 71→the main transmission sub shaft 70→the rear gear 73b of the third transmission gear body 73b→the counter gear 74→the rearward changeover gear 64→the rear-gear-side interlocking connection member 67c of the first speed-change body 67→the slide connection member 67d→the shaft-side interlocking connection members 67a→the main-transmission main shaft 58 whereby the main transmission main shaft 58 is reversely rotated and hence, the rearward changeover is performed.

Here, the slide operating member 92 is engaged with the slide operation receiving member 95c of the first slide body 95 and, at the same time, the restricting members 91a, 91b of the slide restricting body 91 are engaged with the slide operation receiving members 94c, 93c of the second and third slide bodies 94, 93 whereby the movements of both slide bodies 94, 93 are restricted.

(Sub Transmission Casing 54)

The sub transmission casing 54 is, as shown in FIG. 2 to FIG. 5, FIG. 9 and FIG. 10, formed in a cylindrical shape which extends in the fore-and-aft direction, wherein a shaft support wall 118 is formed on a midst portion of an inner peripheral surface, and in the inside of the sub transmission casing 54, a sub transmission mechanism 47 is arranged at a position in front of the above-mentioned shaft support wall 118.

Figure 9:
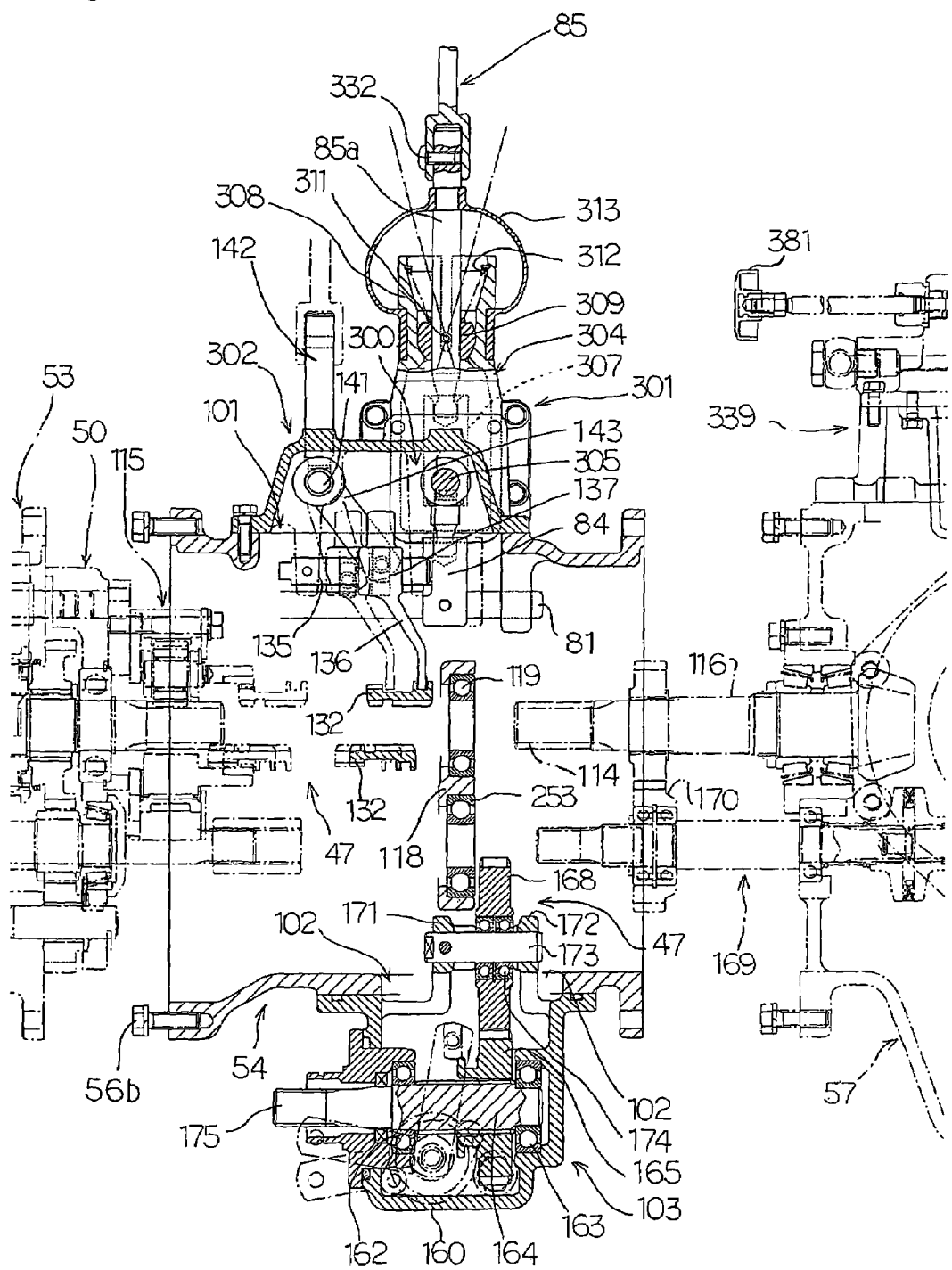
FIG. 9 is an explanatory cross-sectional side view of a sub transmission portion formed in the transmission part.

Then, an opening portion 101 is formed in an upper portion 54b of the sub transmission casing 54 as shown in FIG. 9 and FIG. 10, and the opening portion 101 is covered with a lever proximal portion cover body 301 which constitutes a lid.

That is, the lever proximal portion cover body 301 is, as shown in FIG. 2 to FIG. 5, FIG. 9 and FIG. 10, formed of a cover body 302 which is formed in a lid shape and covers the opening portion 101, a cylindrical laterally-extending cover forming body 303 which is formed in a state that the cover forming body 303 extends in the right-side outward direction from the cover body 302, and a cylindrical longitudinally-extending cover forming body 304 which is formed in a state that the cover forming body 304 extends upwardly from the distal end portion of the laterally-extending cover forming body 303. To an upper portion of the sub transmission casing 54, a connecting flange portion 353 which is formed on a peripheral portion of the cover body 302 is detachably mounted using connecting bolts 354.

Further, a proximal portion of the sub transmission lever 142 is mounted on the cover body 302 and, at the same time, a proximal portion of the main transmission lever 85 is mounted on the longitudinally-extending cover forming body 304 arranged at a position close to the sub transmission lever 142, wherein respective proximal portions of both levers 142, 85 are integrally assembled in the vicinity of the lever proximal portion cover body 301.

Figure 5:
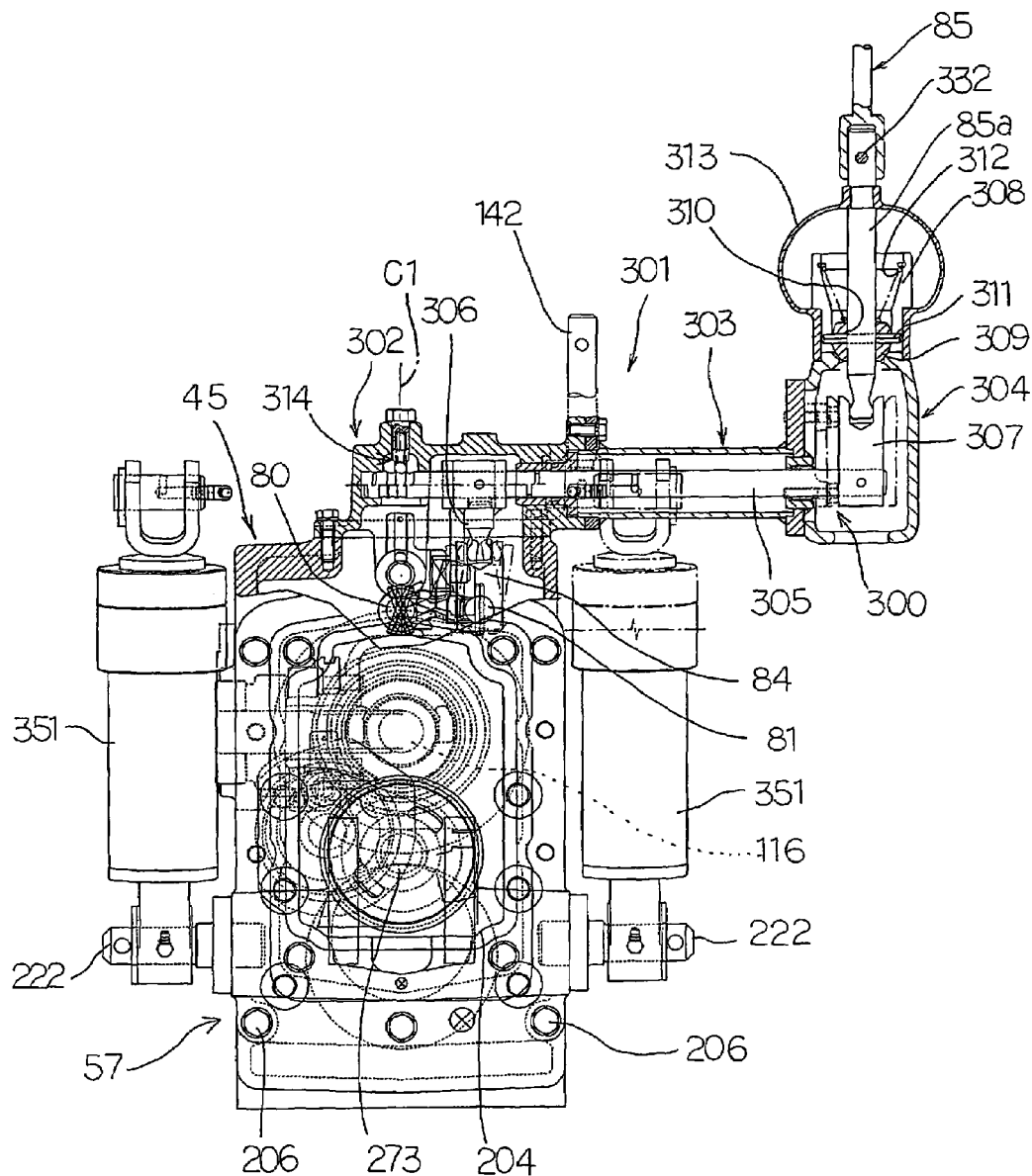
FIG. 5 is a back view with a part cut away of the transmission part.

Further, the main/sub transmission levers 85, 142 which are integrally mounted on the lever proximal portion cover body 301 are, as shown in FIG. 5, arranged in a concentrated manner on either one of left and right sides, the right side in this embodiment with respect to a lateral imaginary center line C1 of the transmission casing 45 in the body advancing direction, that is, at a right-side position of a driver's seat 283 described later which is arranged right above the transmission casing 45.

Here, the lever proximal portion cover body 301 having another mode may be provided, wherein such a lever proximal portion cover body 301 includes a cover body 302, a cylindrical laterally-extending cover forming body 303 which is formed in a state that the cover forming body 303 extends in the left-side outward direction from the cover body 302, and a cylindrical longitudinally-extending cover forming body 304 which is formed in a state that the cover forming body 304 extends upwardly from a distal end portion of the laterally-extending cover forming body 303. Due to such a constitution, it is possible to change the mode of arrangement from the mode in which the main/sub transmission levers 85, 142 are arranged on the right side with respect to the lateral imaginary center line C1 of the transmission casing 45 in the body advancing direction, that is, in the mode in which the main/sub transmission levers 85, 142 are arranged on the right-side position of the driver's seat 283 integrally and in a concentrated manner as in the case of this embodiment to a mode in which the main/sub transmission levers 85, 142 are arranged on the left side position of the driver's seat 283 integrally and in a concentrated manner.

Since the main transmission lever 85 is arranged close to the sub transmission lever 142 in the above-mentioned manner, an operator can suitably manipulate the main transmission lever 85 or the sub transmission lever 142 using another hand while gripping a steering wheel 282 which constitutes a handle described later with one hand.

Further, since the main/sub transmission levers 85, 142 are arranged close to each other in a concentrated manner, it is possible to rapidly and surely perform the shifting from one transmission lever manipulation to another transmission lever manipulation whereby the operability can be enhanced.

Further, with respect to the main transmission lever 85 and the sub transmission lever 142, respective proximal portions are integrally assembled to the lever proximal portion cover body 301 in a state that the respective proximal portions of transmission levers 85, 142 are arranged close to the lever proximal portion cover body 301 and, thereafter, the lever proximal portion cover body 301 can be mounted on the transmission casing 45 and hence, it is possible to easily connect both transmission levers 85, 142 with the transmission casing 45. As a result, it is possible to enhance the efficiency of mounting operation of the main/sub transmission levers 85, 142.

Further, the main/sub transmission levers 85, 142 can be arranged integrally and in a concentrated manner at both of the left-side position and the right-side position of the driver's seat 283 which is arranged right above the transmission casing 45. Accordingly, by arranging the main/sub transmission levers 85, 142 at either one of the left and right positions depending on the preference of an operator, operation conditions and the like, it is possible to achieve the enhancement of the operability of the main/sub transmission levers 85, 142 and the enhancement of the operational efficiency.

The mounting structure of the sub transmission lever 142 and the mounting structure of the sub transmission mechanism 47 and the main transmission lever 85 are explained hereinafter more specifically in conjunction with FIG. 5, FIG. 9 and FIG. 10.

(Mounting Structure of Sub Transmission Lever 142)

The sub transmission lever 142 is interlockingly connected with a sub transmission mechanism 47 described later by way of a sub transmission lever support shaft 141. The sub transmission lever support shaft 141 is arranged in a lying manner with an axis thereof extended in the lateral direction between left and right side walls of the cover body 302 of the above-mentioned lever proximal portion cover body 301. Here, a right-side end portion 336 of the sub transmission lever support shaft 141 extends outwardly from the right side wall, and a proximal end portion of the sub transmission lever 142 is mounted on the right-side end portion 336. On the other hand, at a position right below the sub transmission lever support shaft 141, a shift fork support shaft 135 which has an axis thereof directed in the fore-and-aft direction is arranged, a proximal end portion 137 of the shift fork 136 is mounted on the shift fork support shaft 135 in a state that the proximal end portion 137 is slidable in the fore-and-aft direction, and a distal end portion of an interlocking arm 143 which has a proximal end portion thereof connected to the above-mentioned sub transmission lever support shaft 335 is interlockingly connected with the proximal end portion 137.

(Sub Transmission Mechanism 47)

The sub transmission mechanism 47 is, as shown in FIG. 4, FIG. 7 and FIG. 9, configured such that a sub transmission shaft 116 is interlockingly connected with a distal end portion (a rear end portion) of the above-mentioned main-transmission main shaft 58 by way of a planetary gear mechanism 115. Here, a distal end portion of the main-transmission main shaft 58 extends rearwardly and forms a sun gear 117 which constitutes a portion of the planetary gear mechanism 115. on the other hand, the sub transmission shaft 116 is arranged coaxially with the main-transmission main shaft 58 and, at the same time, has a midst portion thereof supported on a shaft support body 118 provided in the inside of the sub transmission casing 54 by way of a bearing 119. Further, a distal end portion (a rear end portion) of the sub transmission shaft 116 is supported on a shaft support wall 100 formed on a differential gear casing 55 described later by way of a bearing 120.

The planetary gear mechanism 115 has the following constitution. A pair of front and rear inner gear support bodies 121, 122 which are formed in a ring shape and are arranged on an outer periphery of the sun gear 117 are mounted on the above-mentioned shaft support wall forming body 50 using mounting bolts 123 which have axis thereof directed in the fore-and-aft direction. An inner gear 124 has both ends thereof supported on both inner gear support bodies 121, 122. A plurality of planetary gears 125 are arranged in a spaced apart manner in the circumferential direction of the inner gear 124 and, at the same time, the respective planetary gears 125 are meshed with both of the inner gear 124 and the sun gear 117. On the other hand, a carrier 128 is mounted between inner peripheral portions of a pair of front and rear inner gear support bodies 121, and the plurality of planetary gears 125 are integrally and interlockingly connected with the carrier 128.

Further, the carrier 128 has a rear end peripheral portion thereof extended rearwardly to form a cylindrical gear forming member 129 and inner teeth 130 are formed on an inner peripheral surface of the gear forming member 129.

Further, between an outer peripheral surface of the sun gear 117 and an outer peripheral surface of a proximal end portion (a front end portion) 114 of the sub transmission shaft 116, a cylindrical shift gear support body 132 is disposed in spline fitting in a state that the shift gear support body 132 can be shifted in the axial direction.

Further, a distal end portion 138 of the above-mentioned shift fork 136 is engaged with the shift gear support body 132.

In this manner, by performing the rotational manipulation of the sub transmission lever 142 in the fore-and-aft direction, the shift gear support body 132 is shifted in the fore-and-aft direction so that the sub transmission manipulation is performed.

That is, when the sub transmission lever 142 is rotated rearwardly, the interlocking arm 143 is rotated forwardly by way of the sub transmission lever support shaft 141, the shift fork 136 which is connected with the distal end portion of the interlocking arm 143 is slidably moved forwardly, and the shift gear support body 132 which is engaged with the shift fork 136 is shifted frontwardly.

Here, the shift gear support body 132 is shifted in a state that the shift gear support body 132 is extended between an outer peripheral surface of the sun gear 117 and an outer peripheral surface of the proximal end portion (front end portion) 114 of the sub transmission shaft 116 thus establishing a state in which the sun gear 117 and the sub transmission shaft 116 are interlockingly connected with each other by way of the shift gear support body 132 (a state in which the main-transmission main shaft 58 and the sub-transmission shaft 116 are directly connected with each other).

Accordingly, in such a shift position, the power is transmitted to the sub transmission shaft 116 from the sun gear 117 which is integrally formed with the main-transmission main shaft 58 by way of the shift gear support body 132.

Further, when the sub transmission lever 142 is rotated frontwardly, the interlocking arm 143 is rotated rearwardly by way of the sub transmission lever support shaft 141, the shift fork 136 which is connected with the distal end portion of the interlocking arm 143 is slidably moved rearwardly, and the shift gear support body 132 which is engaged with the shift fork 136 is shifted rearwardly.

Then, the shift gear support body 132 is detached from the outer peripheral surface of the sun gear 117 and is shifted to the outer peripheral surface of the proximal end portion (the front end portion) 114 of the sub transmission shaft 116 and, at the same time, the front shift gear 133 is meshed with the inner teeth 130 which are formed on the inner peripheral surface of the gear forming member 129.

Accordingly, in such a shift position, a rotational force of the sun gear 117 which is integrally formed with the main-transmission main shaft 58 is transmitted to the distal end portion 114 of the sub transmission shaft 116 through a path of the planetary gear 125 which is meshed with the sun gear 117→the carrier 128→the inner teeth 130 of the gear forming member 129 which is integrally formed with the carrier 128→the front shift gear 133 of the shift gear support body 132→the shift gear support body 132→the distal end portion 114 of the sub transmission shaft 116.

Here, the power which is subjected to the speed reduction by way of the planetary gear mechanism 115 is transmitted to the sub transmission shaft 116 from the main-transmission main shaft 58 whereby the sub transmission is performed.

(Mounting Structure of Main Transmission Lever 85)

The main transmission lever 85 is, as shown in FIG. 5, FIG. 9 and FIG. 10, interlockingly connected with a lever interlocking shaft 81 by way of the above-mentioned lever interlocking mechanism 300, wherein the lever interlocking mechanism 300 is arranged in the inside of the above-mentioned lever proximal portion cover body 301.

That is, the lever interlocking mechanism 300 is configured as follows. Between a left side wall of a cover body 302 and a right side wall of a longitudinally extending cover forming body 304, an interlocking rod 305 which extends in the lateral direction spans in a state that the interlocking rod 305 is slidable in the lateral direction and is rotatable about an axis thereof. An interlocking-shaft-side operating member 306 is mounted on a left-side portion of the interlocking rod 305 which is positioned in the inside of the cover body 302 in a state that the interlocking-shaft-side operating member 306 extends downwardly and a lower end portion of the interlocking-shaft-side operating member 306 is engaged with an upper end portion of the interlocking-shaft-side operation receiving member 84 which is mounted on a rear end portion of the above-mentioned lever interlocking shaft 81. On the other hand, a lever-side operation receiving member 307 is mounted on a right-side end portion of the interlocking rod 305 which is positioned in the inside of a longitudinally extending cover forming body 304 in a state that the lever-side operation receiving member 307 extends upwardly and a lower end portion of the lever-side operating member 85a is engaged with an upper end portion of the lever-side operation receiving member 307.

Then, a cylindrical tilting receiving portion 308 is communicably connected with an upper end portion of the longitudinally extending cover forming body 304, and an approximately spherical tilting support body 309 is arranged in the inside of the tilting receiving portion 308 in a state that the tilting support body 309 is tiltable in the front, rear, left and right directions arbitrarily. A through hole 310 is formed in a center portion of the tilting support body 309 in a vertically penetrating manner. The lever-side operating member 85a is inserted into the through hole 310 and, at the same time, a midst portion of the lever-side operating member 85a is connected with the tilting support body 309 by way of a support shaft 311 which penetrates the through hole 309 while having an axis thereof in the lateral direction. Numeral 312 indicates a tiltable-support-body compression spring which is interposed between the tilting receiving portion 308 and the tilting support body 309, and numeral 313 indicates a resilient cover body which covers the lever-side operating member 85a.

Further, the main transmission lever 85 has a lower end portion thereof fitted on an upper end portion of the lever-side operating member 85a and is connected with the lever-side operating member 85a using a connecting pin 332.

In such a constitution, by grasping an upper end portion of the main transmission lever 85 and by rotatably manipulating the main transmission lever 85 in the front, rear, left and right directions, it is possible to tilt the lower end portion of the lever-side operating member 85a in the front, rear, left and right directions by way of the tilting support body 309.

Further, by allowing the lever-side operating member 85a to be tilted in the fore-and-aft direction, it is possible to slide the lever interlocking shaft 81 in the fore-and-aft direction by way of the lever-side operation receiving member 307→the interlocking rod 305→interlocking-shaft-side operating member 306→interlocking-shaft-side operation receiving member 84.

On the other hand, by allowing the lever-side operating member 85a to be tilted in the left-and-right direction, it is possible to rotate the lever interlocking shaft 81 about an axis thereof by way of the lever-side operation receiving member 307→the interlocking rod 305→interlocking-shaft-side operating member 306→interlocking-shaft-side operation receiving member 84.

Accordingly, it is possible to easily perform the transmission manipulation in five stages using the above-mentioned main transmission lever 85.

Here, between the cover body 302 and the left-side end portion of the interlocking rod 305, as shown in FIG. 5 and FIG. 10, a branching position temporarily holding portion 314 which temporarily holds the shifting manipulation in the lateral direction of the main transmission lever 85 at a transmission-manipulation-direction branching position at a neutral position is provided.

That is, branching position temporarily holding portion 314 is configured as follows as shown in FIG. 10. In a left-side portion of a ceiling portion 315 of the cover body 302, a ball accommodating longitudinal hole 316 which extends vertically is formed in a penetrating manner. A lower end portion of a temporarily holding ball 319 is projected from a lower-end opening portion 317 of the ball accommodating longitudinal hole 316 by way of a compression spring 318, while on an outer peripheral surface of the left-side end portion of the interlocking rod 305, a left-side engaging groove 320, a center engaging groove 321 and a right-side engaging groove 322 are formed in a state that these grooves are arranged close to each other in the lateral direction. A lower end portion of the temporarily holding ball 319 is engaged with any one of the engaging grooves. Numeral 436 indicates a spring holding body which holds the compression spring 318 from above and is fixed to the ball accommodating longitudinal hole 316.

In such a constitution, when the main transmission lever 85 is manipulated to the neutral position, the interlocking rod 305 is slidably moved, the lower end portion of the temporarily holding ball 319 is engaged with the center engaging groove 321. When the main transmission lever 85 is rotated to the left side (or to the right side) from such a state, the interlocking rod 305 is slidably moved to the right side (or to the left side) and the lower end portion of the temporarily holding ball 319 is engaged with the left-side (right-side) engaging groove 320 (322).

Accordingly, even at the neutral position, the operator can perceive that the main transmission lever 85 is shifted to the shift manipulation position with his hand. As a result, it is possible to enhance the operability of the main transmission lever 85.

Further, as shown in FIG. 7, between an upper portion of the inner support wall 57 of the main transmission casing 53 and a front end portion of the slide body support shaft 80, a transmission position temporarily holding portion 323 which temporarily holds the shift manipulation in the fore-and-aft direction of the main transmission lever 85 at respective transmission positions is provided.

That is, in the upper portion of the inner support wall 57 of the main transmission casing 53, an insertion support hole 324 which allows the insertion of a front end portion of the slide body support shaft 80 and supports the front end portion is formed. An upwardly-extending ball accommodating longitudinal hole 325 is formed in the inner support wall 57 from an upper peripheral surface of the insertion support hole 324. A lower end portion of a temporarily holding ball 328 is projected from a lower-end opening portion 326 of the ball accommodating longitudinal hole 325 by way of a compression spring 327. On the other hand, on an outer peripheral surface of the front end portion of the slide body support shaft 80, a front-side engaging groove 329, a center engaging groove 330 and a rear-side engaging groove 331 are formed in a state that these grooves are arranged close to each other in the fore-and-aft direction, wherein a lower end portion of the temporarily holding ball 328 is engaged with any one of the engaging grooves.

In such a constitution, when the main transmission lever 85 is manipulated to the neutral position, the slide body support shaft 80 is slidably moved, the lower end portion of the temporarily holding ball 328 is engaged with the center engaging groove 333. When the main transmission lever 85 is rotatably manipulated to the frond side (or to the rear side) from such a state, the slide body support shaft 80 is slidably moved to the front side (or to the rear side) and the lower end portion of the temporarily holding ball 328 is engaged with the rear-side (front-side) engaging groove 331 (329).

Accordingly, the operator can perceive that the main transmission lever 85 is shifted to the respective transmission positions with his hand. As a result, it is possible to enhance the operability of the main transmission lever 85.

Further, an opening portion 102 is formed in a bottom portion 54d of the sub transmission casing 54 and the front-wheel-drive power takeout portions 103 described later are mounted through the opening portion 102. The front-wheel-drive power takeout portions 103 are respectively interlockingly connected with the sub transmission mechanism 47.

(Differential Gear Casing 55)

Figure 11:
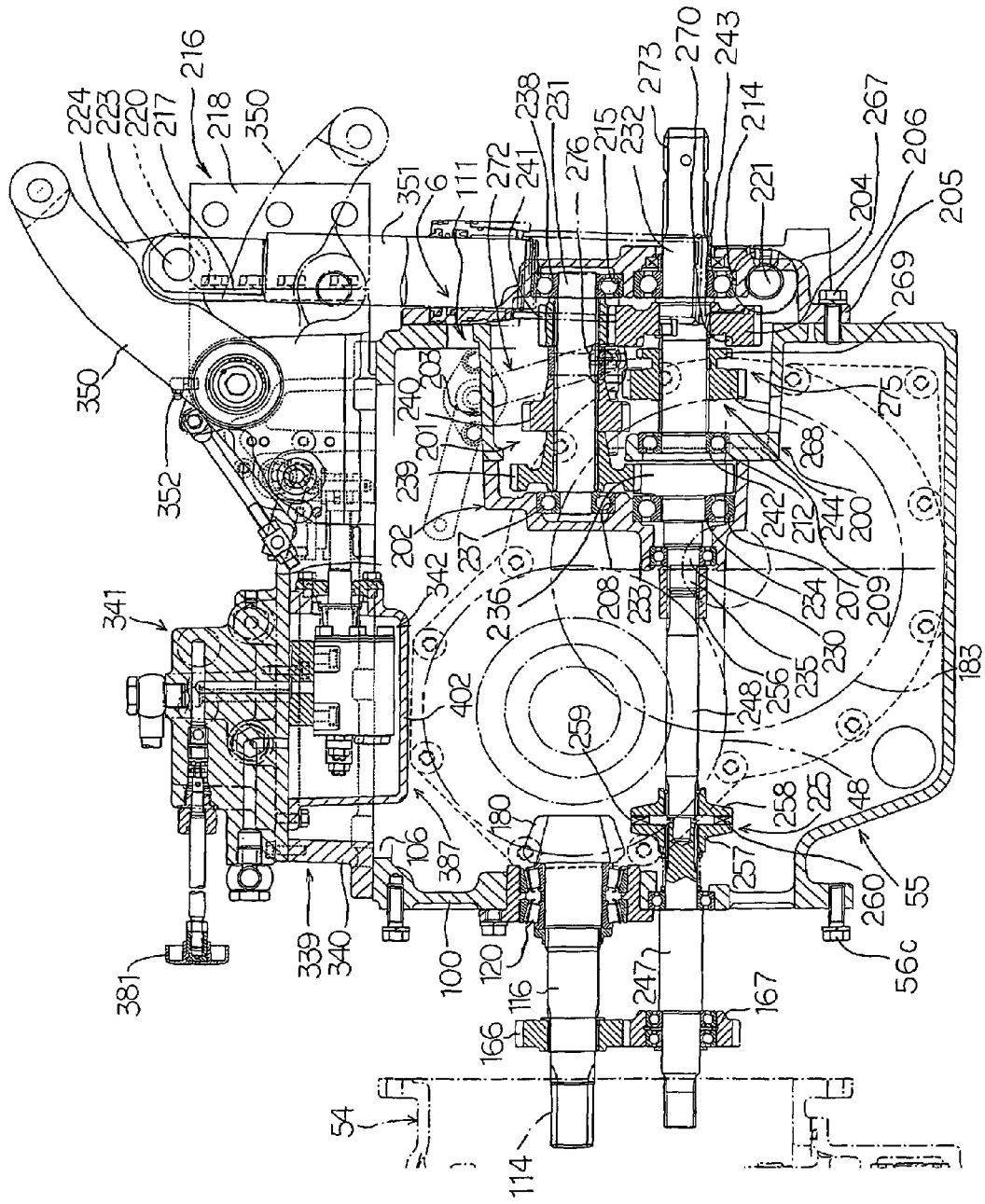
FIG. 11 is an explanatory cross-sectional side view of a differential mechanism and a PTO transmission portion mounted in the transmission part.
Figure 12:
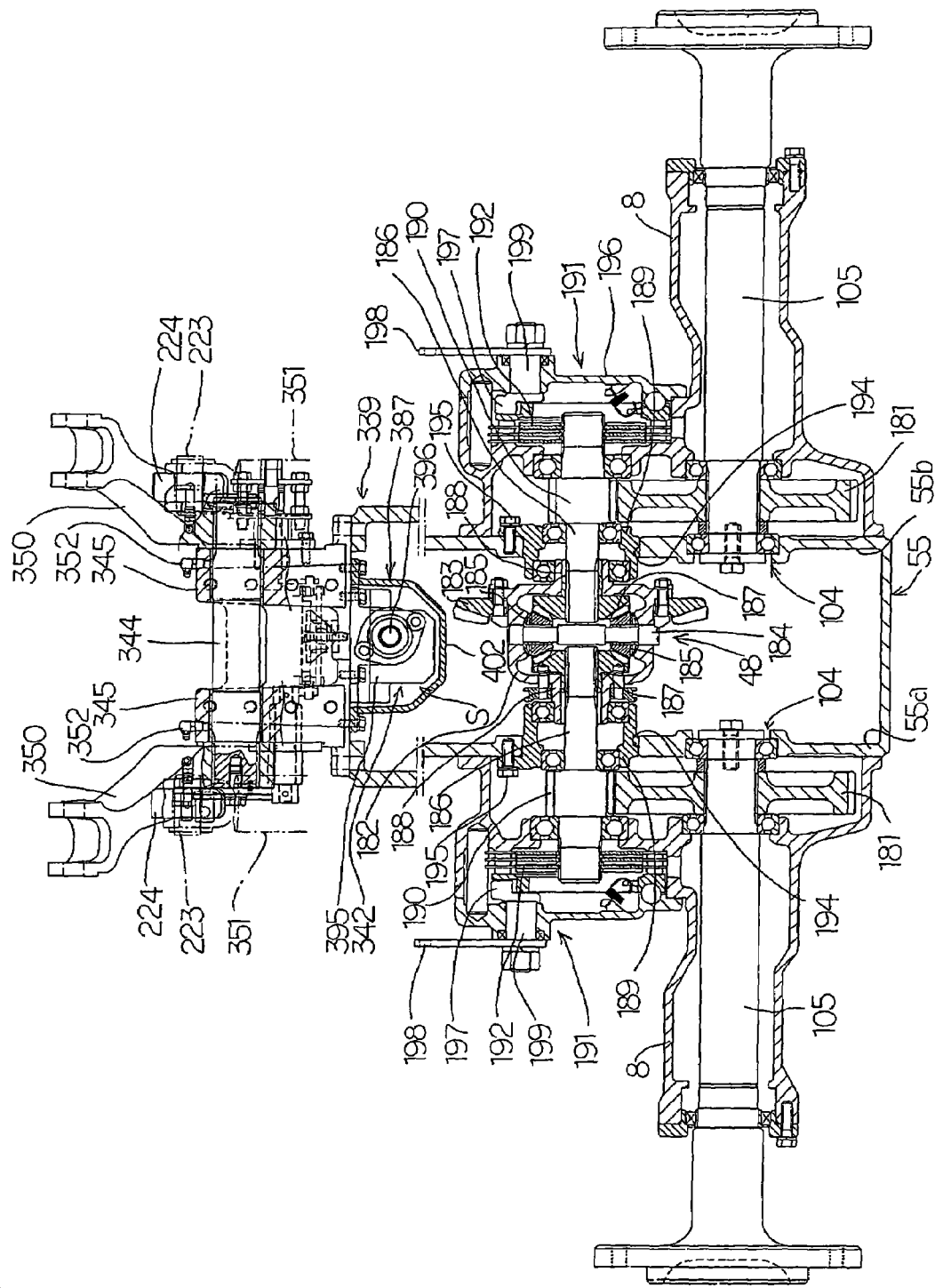
FIG. 12 is an explanatory cross-sectional back view of a differential mechanism of the transmission part.

The differential gear casing 55 is formed in a box shape with an opened upper surface as shown in FIG. 11 and FIG. 12. Opening portions 104, 104 are respectively formed on left and right side walls 55a, 55b. The rear axle cases 8, 8 are communicably connected with the differential gear casing 55 by way of the respective opening portions 104, 104. In the inside of the rear axle cases 8, 8, rear axles 105, 105 which extend in the lateral direction are inserted and are rotatably supported, wherein the respective rear axle 105, 105 are interlockingly connected with the differential mechanism 48.

Further, in the differential gear casing 55, a front wall is formed of a shaft support wall 100 and a rear end portion of the sub transmission shaft 116 and amidst portion of a third divided transmission shaft 247 are supported on the shaft support wall 100.

Further, in the differential gear casing 55, as shown in FIG. 11 and FIG. 12, a maintenance opening portion 106 is formed in a ceiling portion, a lift arm support body 339 is detachably mounted on a peripheral portion of the opening portion 106, a hydraulic circuit body 341 is detachably mounted on a hydraulic body circuit body support member 340 which is formed by extending the lift arm support body 339 frontwardly, and a hydraulic control valve 342 is mounted on the hydraulic circuit body 341.

In such a constitution, since the hydraulic circuit body 341 and the hydraulic control valve 342 are formed as bodies separate from the lift arm support body 339, even when blowholes are formed in the lift arm support body 339 formed by molding, there is no possibility that the pressurized oil passes through the lift arm support body 339 whereby it is no more necessary to worry about the adverse influence attributed to the blowholes such as leaking of oil or the like.

Further, in forming the lift arm support body 339, measures to cope with the generation of the blowholes can be easily taken against the occurrence of blowholes and hence, a yield rate of the lift arm support body 339 can be enhanced whereby the manufacturing cost can be reduced.

Still further, the lift arm support body 339 per se can be minimized as much as possible and hence, it is possible to acquire the easiness of handling of the lift arm support body during manufacturing and forming as well as the reduction of the manufacturing cost.

Further, it is possible to detachably mount the hydraulic circuit body 341 and the hydraulic control valve 342 without removing the lift arm support body 339 which is a relatively heavy object from the transmission casing 45 and hence, it is possible to ensure the favorable maintenance.

Further, the hydraulic circuit body 341 is mounted on and fixed to the hydraulic circuit body support member 340 which is formed by extending the lift arm support body 339 frontwardly. Accordingly, it is possible to fix the hydraulic circuit body 341 to the hydraulic circuit body support member 340 in a state that the lift arm support body 339 is preliminarily fixed to the transmission casing 45 or it is possible to integrally mount the hydraulic circuit body support member 340 and the hydraulic circuit body 341 on the transmission casing 45 in a state that the hydraulic circuit body 341 is preliminarily fixed to the hydraulic circuit body support member 340 whereby it is possible to effectively perform the assembling operation corresponding to working conditions and the like.

By mounting the hydraulic control valve 342 on the hydraulic circuit body 341, it is possible to arrange the hydraulic control valve 342 and the hydraulic circuit body 341 in a compact and concentrated manner and, at the same time, it is possible to integrally fix the hydraulic control valve 342 and the hydraulic circuit body 341 to the lift arm support body 339 or the hydraulic circuit body support member 340 whereby the assembling performance of these parts can be enhanced.

Further, the hydraulic circuit body 341 which is formed separately from the lift arm support body 339 can realize the concentrated arrangement of the valves and the like and hence, the hydraulic circuit body 341 can be formed in a compact form.

Next, the constitutions of the above-mentioned lift arm support body 339, hydraulic circuit body 341 and hydraulic control valve 342 are specifically explained in conjunction with FIG. 11 to FIG. 16.

(Lift Arm Support Body 339)

The lift arm support body 339 includes, as shown in FIG. 13 to FIG. 16, a ring-like mounting member 343 which mounts the lift arm support body 339 in alignment with a peripheral portion of the opening portion 106 formed in a ceiling portion of the differential gear casing 55, the cylindrical hydraulic circuit body support member 340 which is raised upwardly at a front portion of the mounting member 343 so as to support the hydraulic circuit body 341, and a pair of left and right pivoting members 345, 345 which are raised upwardly at a rear portion of the mounting member 343 so as to pivotally support the lift arm support shaft 344.

Further, mounting bolt holes 346 which constitute a plurality of (ten pieces in this embodiment) mounting holes are formed in the mounting member 343 in a state that the mounting holes are positioned at a front side and left and right sides of a pair of left and right pivoting members 345, 345 and between both pivoting members 345, 345. Here, the mounting bolt holes 346 positioned between both pivoting members 345, 345 are arranged close to the lift arm support shaft 344 which is pivotally supported by the pivoting members 345, 345.

Figure 14:
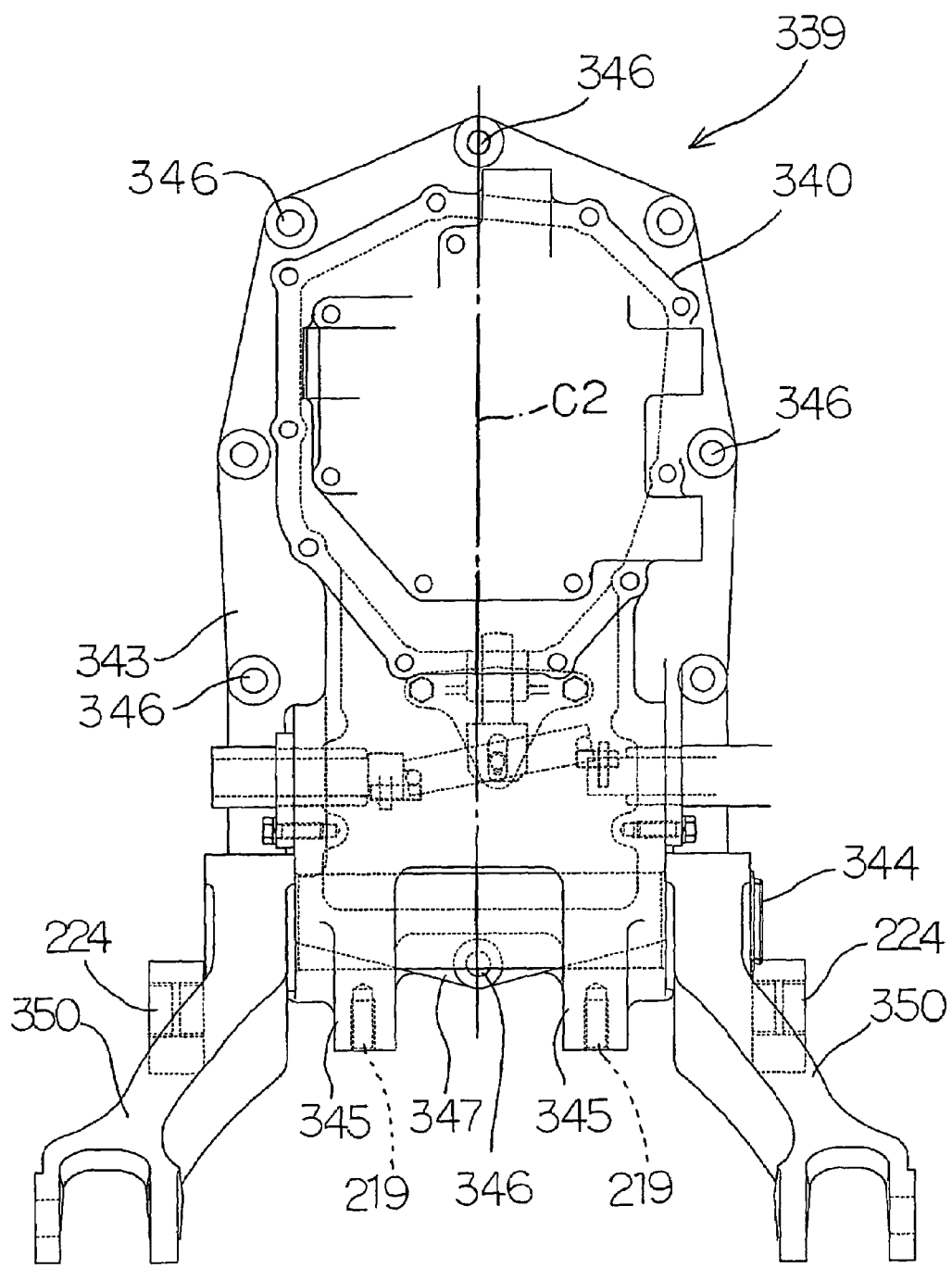
FIG. 14 is a plan view of the lift arm support body.

That is, as shown in FIG. 14 and FIG. 16, one mounting bolt hole 346 is formed in a front end portion of the mounting member 343. At left-and-right symmetrical positions with respect to a lateral imaginary center line C2 which extends in the fore-and-aft direction passing through the center of the mounting bolt hole 346, four mounting bolt holes 346 are formed respectively in a spaced apart manner with a fixed distance in the fore-and-aft direction. One mounting bolt hole 346 is formed in a rear portion of the mounting member 343 on the above-mentioned lateral imaginary center line C2. With respect to the mounting bolt hole 346 formed in the rear portion of the mounting member 343, in a portion of the mounting member 343 which is positioned between the pair of left and right pivoting members 345, 345 and right below the lift arm support shaft 344, a recessed portion 347 which is opened at an upper portion and a rear portion is formed, and the mounting bolt hole 346 is formed in the recessed portion 347.

In this manner, due to the wall shape of the left and right pivoting members 345, 345, it is possible to ensure the sufficient strength and hence, it is unnecessary to form walls on the mounting member 343 other than both pivoting members 345, 345.

Further, the mounting bolt holes 346 which are formed between the pair of the left and right pivoting members 345, 345 formed on the mounting member 343 are formed in the recessed portion 347 which is formed in the portion of the mounting member 343 which is positioned between the pair of left and right pivoting members 345, 345 and right below the lift arm support shaft 344. Accordingly, it is possible to arrange the mounting bolt holes 346 formed between the pivoting members 345, 345 close to the lift arm support shaft 344 which is pivotally supported by the pivoting members 345, 345 whereby even when a tensile load acts on the lift arm support shaft 344, a bending moment does not act on a rear portion of the mounting member 343 whereby it is possible to make the mounting member 343 light-weighted by decreasing a wall thickness of the mounting member 343.

Further, it is possible to form the mounting bolt holes 346 in the mounting member 343 at front, rear, left and right positions in a well-balanced manner whereby it is possible to ensure the sufficient mounting strength of the mounting member 343.

Further, all mounting bolt holes 346 can be formed in the mounting member 343 from above thus facilitating the hole forming operation.

Further, since the mounting operation of the mounting member 343 can be performed using one kind of tool, the mounting operation of the mounting member 343 can be simplified.

Still further, the lift arm support shaft 344 can be formed by molding using only compact two-split upper and lower molds without requiring a core and without extending the mounting member 343 rearwardly and hence, it is possible to manufacture the lift arm support shaft 344 at a low cost.

Figure 15:
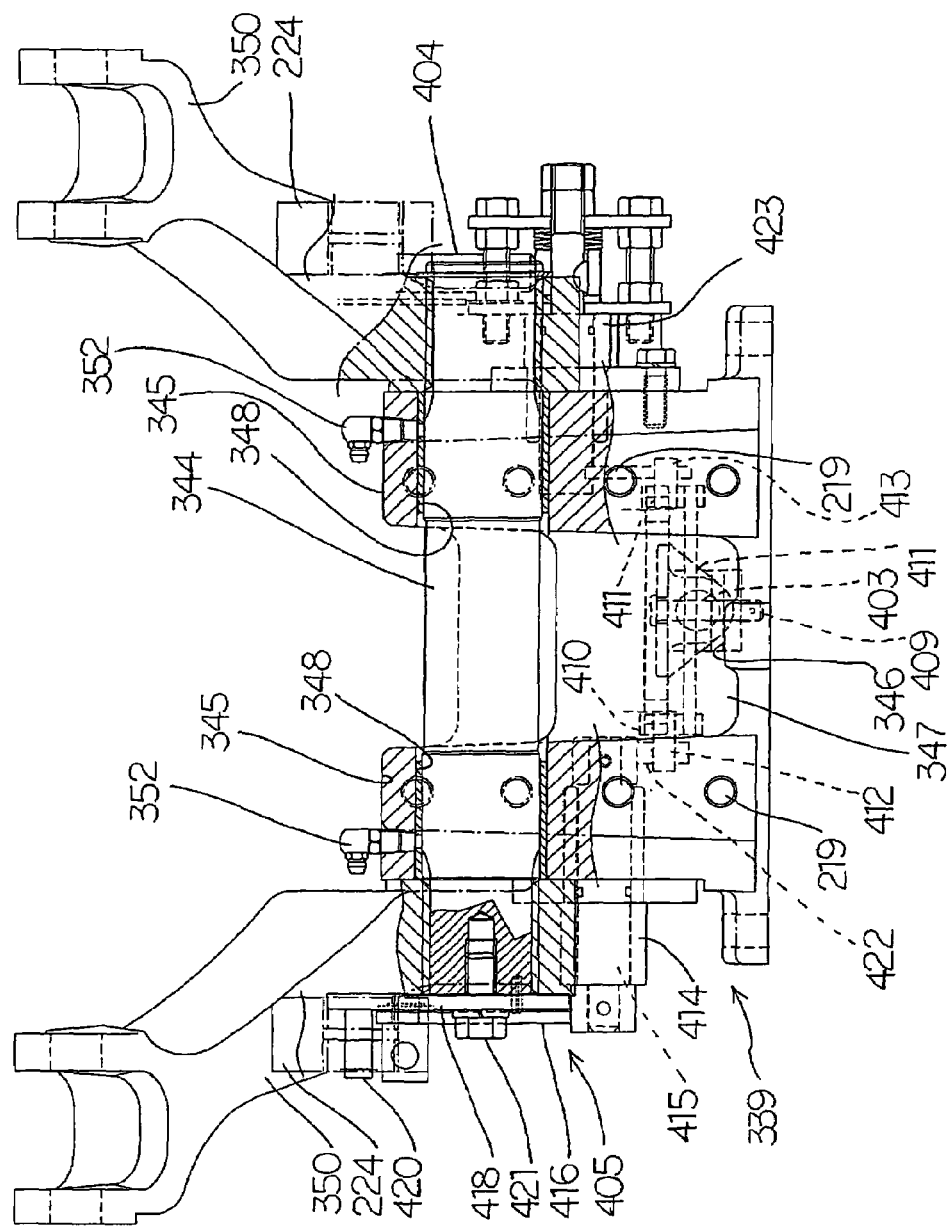
FIG. 15 is a back view with a part cut away of the lift arm support body.

In upper portions of the pair of left and right pivoting members 345, 345, as shown in FIG. 15, support shaft insertion holes 345, 348 which respectively open in the lateral direction are formed. The lift arm support shaft 344 which has an axis thereof arranged in the lateral direction is extended between both support shaft insertion holes 348, 348 in a state both sides of the lift arm support shaft 344 are inserted into both support shaft insertion holes 348, 348 in a penetrating manner. Proximal end portions of the respective lift arms 350, 350 are mounted on left/right-side end portions 349, 349 of the lift arm support shaft 344. As shown in FIG. 2 to FIG. 5, between midst portions of the respective lift arms 350, 350 and a lower portion of the differential gear casing, lift cylinders 351, 351 which extend and contract in the vertical direction are interposed and the lift arms 350, 350 are rotatably operated in the vertical direction by both lift cylinders 351, 351.

Further, the lift cylinders 351, 351 which impart the vertical rotatable operation to the lift arms 350, 350 are hydraulically controlled by a hydraulic control valve 342 by way of the hydraulic circuit body 341.

Here, a single operation type cylinder is adopted as the lift cylinder 351, wherein when a pressurized oil is supplied to the lift cylinder 351, the lift cylinder 351 is extended and the lift arm 350 is rotated upwardly, while when the pressurized oil is discharged from the lift cylinder 351, the lift cylinder 351 is contracted due to a deadweight of a working machine (not shown in the drawing) which is connected to the lift arm 350 and the lift arm 350 is rotated downwardly.

Further, to upper end portions of the respective pivoting members 345, 345, grease nipples 352, 352 which constitute lubricant supply portions for supplying a lubricant to the lift arm support shaft 344 are provided.

In this manner, by supplying the grease or the like which constitutes the lubricant to an outer peripheral surface of a portion of the lift arm support shaft 344 which is pivotally supported by the respective pivoting members 345, 345 from the grease nipples 352, 352 which are mounted on the upper end portions of the respective left and right pivoting members 345, 345, it is possible to ensure the favorable rotational performance of the lift arm support shaft 344 which is extended between both pivoting members 345, 345.

Further, the lift arm support body 339 can ensure the sufficient strength due to the wall shape of the pivoting members 345, 345 whereby walls are unnecessary except for portions of the pivoting members 345, 345 which support the lift arm support shaft 344 and hence, the lift arm support body 339 can be made light-weighted.

(Hydraulic Circuit Body 341)

The hydraulic circuit body 341 is, as shown in FIG. 13 and FIG. 16 to FIG. 18, constituted of a block-like circuit body block 355 and a connecting flange portion 356 which is integrally formed by molding on a peripheral portion of a lower end of the circuit body block 355.

Figure 16A:
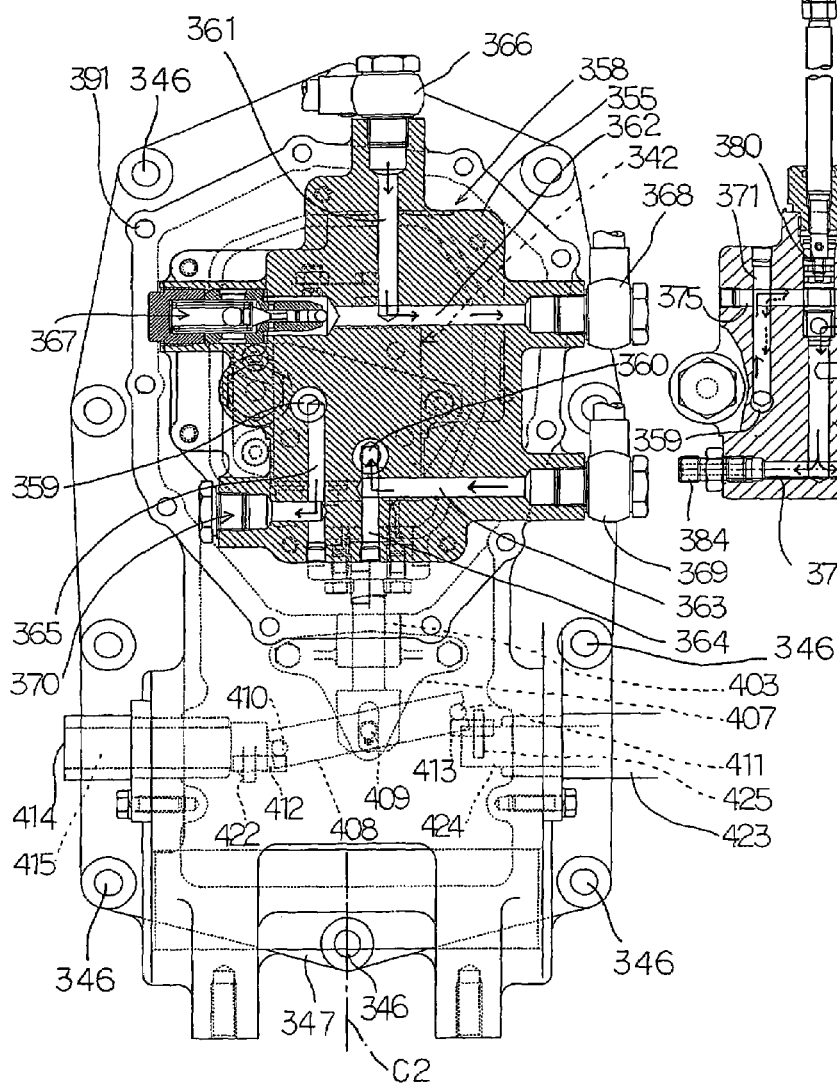
FIG. 16 is an explanatory cross-sectional plan view of a hydraulic circuit body formed on the transmission part.
Figure 16B:
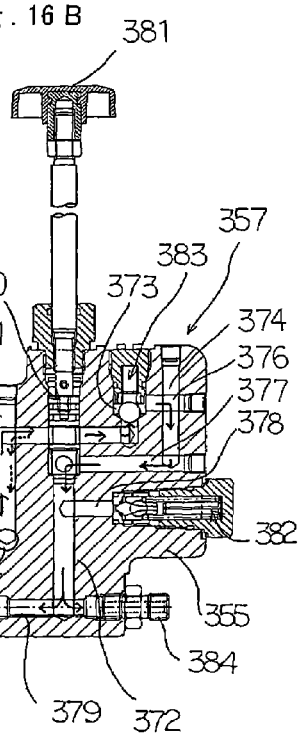

Here, with respect to the circuit body block 355, as shown in FIG. 16B, an upper-layer oil passage forming surface portion 357 is formed in an upper portion of the circuit body block 355 and, at the same time, as shown in FIG. 16A, a lower-layer oil passage forming surface portion 358 is formed in a lower portion of the circuit body block 355. Further, as shown in FIG. 16A, an upper-layer oil passage connecting longitudinal oil passage 359 which extends in the vertical direction is formed in a left-side center portion of the circuit body block 355 and an upper end portion of the upper-layer oil passage connecting longitudinal oil passage 359 is connected to the upper-layer oil passage forming surface portion 357, while a lower-layer oil passage connecting longitudinal oil passage 360 which extends in the vertical direction is formed in a rear center portion of the circuit body block 355, and an upper end portion of the lower-layer oil passage connecting longitudinal oil passage 360 is connected to the lower-layer oil passage forming surface portion 358, and lower end portions of both longitudinal oil passages 359, 360 are connected with the hydraulic control valve 342 described later.

Next, for facilitating the explanation, first of all, the lower-layer oil passage forming surface portion 358 is explained and, subsequently, the upper-layer oil passage forming surface portion 357 is explained and, thereafter, the connection between these passages is explained.

First of all, the lower-layer oil passage forming surface portion 358 forms, as shown in FIG. 16A, an oil passage which extends in the fore-and-aft direction and in the lateral direction on a same horizontal plane in a lower portion of the circuit body block 355. The oil passage is formed of a rearward extending oil passage 361 which extends rearwardly from a front-end center portion below the circuit body block 355, a front lateral extending oil passage 362 which extends in the lateral direction orthogonal to a rear end portion of the rearward extending oil passage 361, a rear-portion leftward extending oil passage 363 which is formed in parallel to the front lateral extending oil passage 362 and is extended leftwardly from a rear right-side end portion thereof, a rear-center-portion frontward extending oil passage 364 which is formed orthogonal to a left-side end portion of the rear-portion leftward extending oil passage 363 and extends forwardly from a rear center portion thereof, and a rear-left-side-portion frontward extending oil passage 365 which is formed in parallel to the rear-center-portion frontward extending oil passage 364 and extends forwardly from a rear left-side portion thereof.

Further, a front end portion of the rear-center-portion frontward extending oil passage 364 is connected with an upper end portion of the above-mentioned lower-layer oil passage connecting longitudinal oil passage 360, while a front end portion of the rear-left-side-portion frontward extending oil passage 365 is connected with a midst portion of the upper-layer oil passage connecting longitudinal oil passage 359.

Still further, a pump connecting portion 366 which is connected with a geared pump (not shown in the drawing) is provided to a front end portion of the rearward extending oil passage 361, a relief valve 367 is provided to a left-side end portion of the front lateral extending oil passage 362, and a feed-side valve connecting portion 368 which is connected with a sub control valve (not shown in the drawing) is provided to a right-side end portion of the front lateral extending oil passage 362. To a right-side end portion of the rear-portion leftward extending oil passage 363, a return-side valve connecting portion 369 which is connected with the sub control valve is provided. To a rear portion of the rear-left-side-portion frontward extending oil passage 365, a single-motion pressurized-oil external takeout connecting portion 370 is communicably connected.

The upper-layer oil passage forming surface portion 357 forms, as shown in FIG. 16B, an oil passage which extends in the fore-and-aft direction and in the lateral direction on a same horizontal plane in an upper portion of the circuit body block 355. That is, first, second, third and fourth rearward extending oil passages 371, 372, 373, 374 which extend rearwardly from a front end portion of the upper portion of the circuit body block 355 are formed in a spaced apart manner in the lateral direction. A right-side extending oil passage 375 which extends rightwardly from a lefts-side end portion of the upper portion of the circuit body block 355 is formed. First, second and third left-side extending oil passages 376, 377, 378 which extend leftwardly from a right-side end portion of the upper portion of the circuit body block 355 are formed. Further, in the rear portion of the circuit body block 355, a rear-portion lateral through oil passage 379 which penetrates the rear portion of the circuit body block 355 in the lateral direction is formed.

Further, the first rearward extending oil passage 371 has a front portion thereof arranged orthogonal to the left-side portion of the above-mentioned right-side extending oil passage 375 and has a rear end portion thereof connected with an upper end portion of the above-mentioned upper-layer oil passage connecting longitudinal oil passage 359.

The second rearward extending oil passage 372 has a rear end portion thereof connected with a center portion of the above-mentioned rear-portion lateral through oil passage 379. A flow rate adjusting valve 380 is provided to a front portion of the second rearward extending oil passage 372, wherein an adjusting tab 381 is mounted on the flow rate adjusting valve 380 in a state that the adjusting tab 381 projects frontwardly. Amidst portion of the second rearward extending oil passage 372 is connected with a left-side end portion of the above-mentioned second left-side extending oil passage 377, while a rear portion of the second rearward extending oil passage 372 is connected with a left-side end portion of the above-mentioned third left-side extending oil passage 378, and a safety valve 382 is provided to the third left-side extending oil passage 378.

The third rearward extending oil passage 373 has a rear end portion thereof connected to a right-side end portion of the above-mentioned right-side extending oil passage 375 and an midst portion thereof connected to a left-side end portion of the above-mentioned first left-side extending oil passage 376, wherein a check valve 383 is provided to each connecting portion.

The fourth rearward extending oil passage 374 has an midst portion thereof arranged orthogonal to the first left-side extending oil passage 376 and has a rear end portion thereof connected to a right-side portion of the second left-side extending oil passage 377.

Further, to the above-mentioned left and right-side end portions of the rear-portion lateral through oil passage 379, lift cylinder connecting portions 384, 384 are respectively provided, and the respective lift cylinder connecting portions 384, 384 and the above-mentioned lift cylinders 351, 351 are connected with each other by way of hydraulic pipes (not shown in the drawing).

Figure 17:
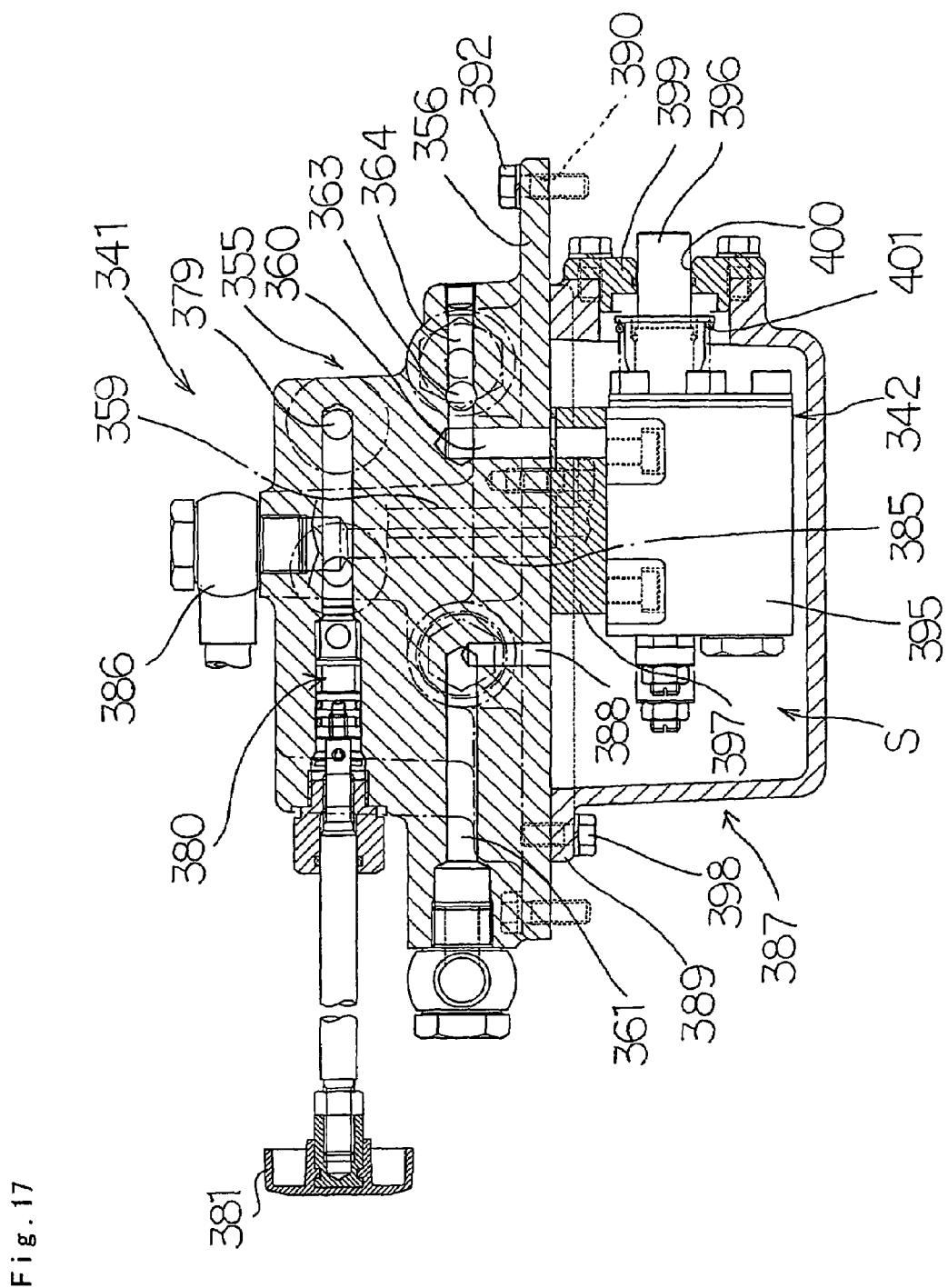
FIG. 17 is a cross-sectional side view of a center portion of the hydraulic circuit body.
Figure 18:
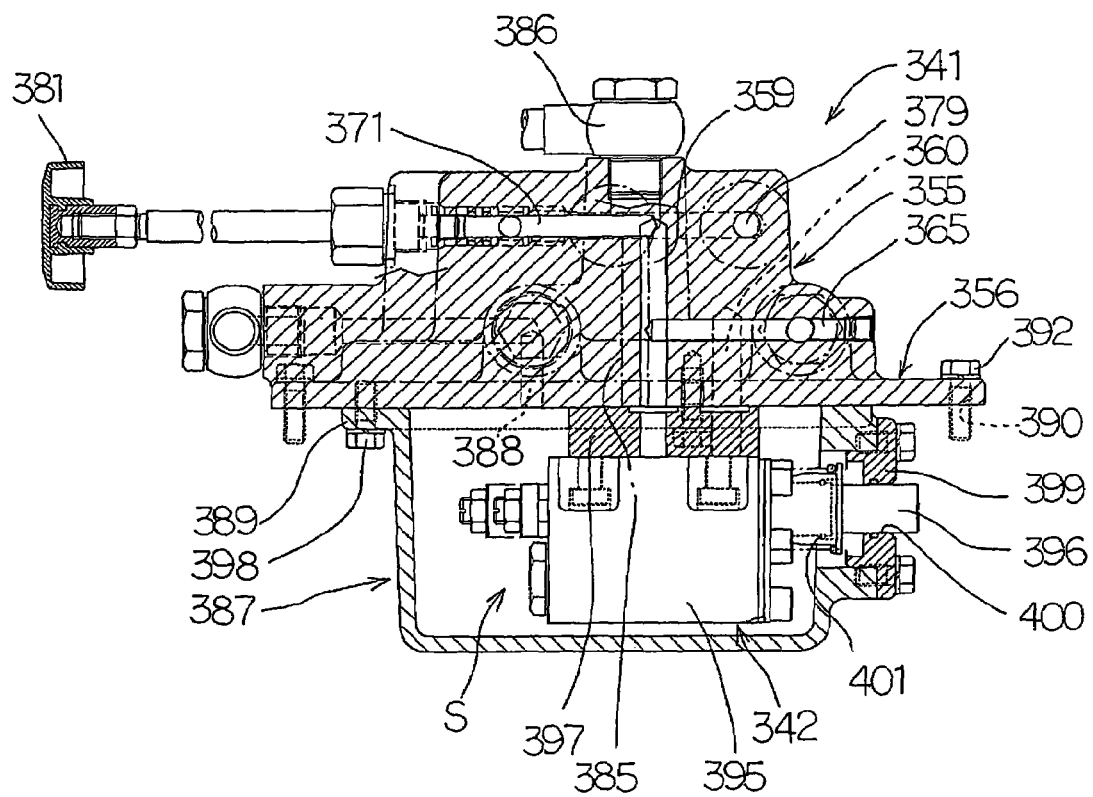
FIG. 18 is a cross-sectional side view of a left side portion of the hydraulic circuit body.

In a left-side rear portion of the circuit body block 355, as shown in FIG. 17 and FIG. 18, a tank-side return longitudinal oil passage 385 which penetrates in the vertical direction and constitutes a drain circuit is formed. A tank connecting portion 386 is provided to an upper end portion of the tank-side return longitudinal oil passage 385 and a hydraulic tank (not shown in the drawing) is connected with the tank connecting portion 386 by way of a hydraulic pipe. On the other hand, a lower end portion of the tank-side return longitudinal oil passage 385 is opened in the inside of a valve cover body 387 described later. Numeral 388 indicates a relief drain oil passage, wherein the relief drain oil passage 388 has an upper end portion thereof connected with a rear end portion of the rearward extending oil passage 361 and has a lower end portion thereof opened in the inside of the valve cover body 387.

In such a constitution, the pressurized oil which is supplied under pressure to the pump connecting portion 366 from the geared pump is supplied under pressure to the respective lift cylinder 351, 351 through a path of the rearward extending oil passage 361→the front lateral extending oil passage 362→the feed-side valve connecting portion 368→the sub control valve (not shown in the drawing) →the return-side valve connecting portion 369→the rear-portion leftward extending oil passage 363→the rear center portion frontward extending oil passage 364→the lower-layer oil passage connecting longitudinal oil passage 360→the hydraulic control valve 342→the upper-layer oil passage connecting longitudinal oil passage 359→the first rearward extending oil passage 371→the right-side extending oil passage 375→the third rearward extending oil passage 373→the check valve 383→the first left-side extending oil passage 376→the fourth rearward extending oil passage 374→the second left-side extending oil passage 377→the flow rate adjusting valve 380→the second rearward extending oil passage 372→the rear-portion lateral through oil passage 379→the respective lift cylinder connecting portions 384, 384→the respective lift cylinders 351, 351. As a result, the respective lift cylinders 351, 351 are operated and extended.

Further, the pressurized oil in the inside of the respective lift cylinders 351, 351 can be returned to the inside of the oil tank through a path of the respective lift cylinder connecting portions 384, 384→a rear-portion lateral through oil passage 379→the second rearward extending oil passage 372→the flow rate adjusting valve 380→the right-side extending oil passage 375→the first rearward extending oil passage 371→the upper-layer oil passage connecting longitudinal oil passage 359→the hydraulic control valve 342→the valve cover body 387 described later→the tank-side return longitudinal oil passage 385→the tank connecting portion 386→the hydraulic pipe→the inside of the hydraulic tank.

Here, the supply of the pressurized oil to the lift cylinders 351, 351 and the discharge of the pressurized oil from the lift cylinders 351, 351 can be performed in response to the changeover operation of the hydraulic control valve 342 described later.

As described above, the circuit body block 355 is formed in the upper and lower two-layered state consisting of the upper-layer oil passage forming surface portion 357 and the lower-layer oil passage forming surface portion 358, wherein in the respective oil passage forming surface portions 357, 358, the oil passages which extend in the for-and-aft direction and the lateral direction (the left-and-right direction) are formed and, at the same time, the given oil passages are connected in a state that the oil passages cross each other orthogonally. Further, in the circuit body block 355, the oil passages which extend in the vertical direction are formed and connect either one of oil passages which are formed in the upper-layer oil passage forming surface portion 357 and the lower-layer oil passage forming surface portion 358 with the hydraulic control valve 342 described later in an orthogonal state. Accordingly, it is possible to easily and surely form the hydraulic passage in the inside of the circuit body block 355.

Here, the directions of the oil passages are not limited to the fore-and-aft direction and the left-and-light direction so long as the oil passages are formed on the same plane and the oil passages can be formed by extending in the given directions in conformity with the extending directions of the hydraulic pipes with which the oil passages are connected. As a result, it is possible to easily perform the connection operation and the piping operation of the hydraulic pipes.

Figure 13:
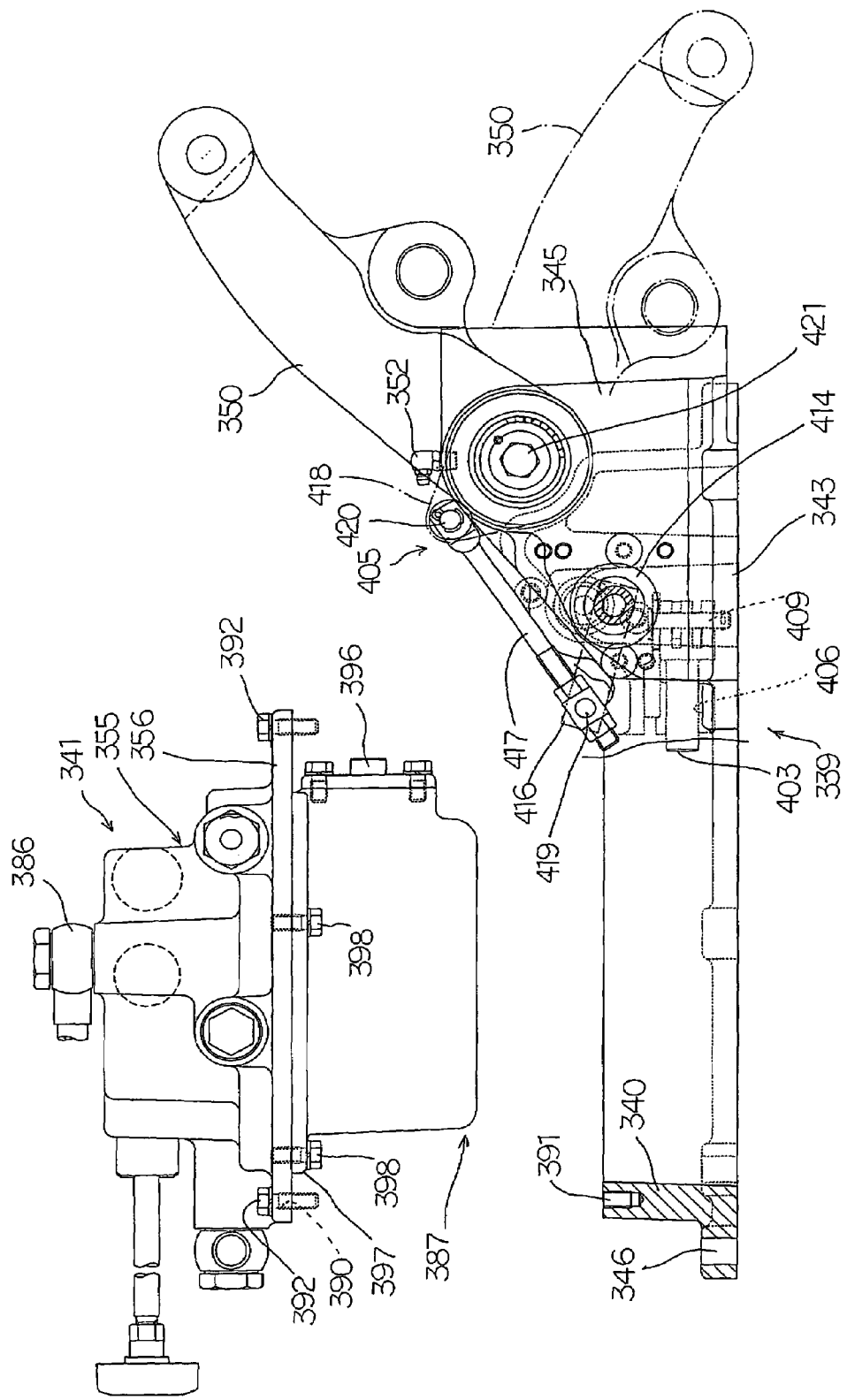
FIG. 13 is an explanatory side view with a part cut away of a lift arm support body which is mounted on the transmission part.

Further, the connecting flange portion 356 of the hydraulic circuit body 341 is, as shown in FIG. 13, FIG. 17 and FIG. 18, formed in a state that the connecting flange portion 356 is, as a lid, capable of closing an upper surface of the above-mentioned hydraulic circuit body support member 340 formed in the lift arm support body 339, and a plurality of bolt insertion holes 390 are formed in a peripheral portion thereof.

Still further, in an upper end surface of the hydraulic circuit body support member 340, a plurality of bolt thread holes 391 which are aligned with the above-mentioned bolt insertion holes 390 are formed. By aligning the respective bolt insertion holes 390 formed in the connecting flange portion 356 with the respective bolt thread holes 391 and, at the same time, by threadedly inserting connecting bolts 392 into both holes 390, 391, it is possible to detachably connect the hydraulic circuit body 341 to the hydraulic circuit body support member 340.

(Hydraulic Control Valve 342)

The hydraulic control valve 342 includes, as shown in FIG. 17 and FIG. 18, a valve body 395 and a spool 396 which is interlockingly connected with the valve body 395, wherein the valve body 395 is mounted on a lower surface of the hydraulic circuit body 341 by way of a spacer 397 in a state that the valve body 395 extends downwardly and the spool 396 extends rearwardly from the valve body 395.

Further, the valve cover body 387 is mounted on the lower surface of the hydraulic circuit body 341, the hydraulic control valve 342 is housed in the inside of the valve cover body 387, a drain from the hydraulic control valve 342 can be discharged through the tank-side return longitudinal oil passage 385 which constitutes a drain circuit by way of a drain receiving space S formed in the inside of the valve cover body 387.

Further, in the inside of the drain receiving space S, the drain which is discharged through the respective valves mounted in the hydraulic circuit body 341 is recovered.

Here, the valve cover body 387 is formed in a box shape having an open-ended upper surface, wherein an upper end peripheral portion 389 of the valve cover body 387 is hermetically mounted on a lower surface of the hydraulic circuit body 341 using mounting bolts 398. Further, a spool projecting hole 400 is formed in a rear wall of the valve cover body 387 by way of a seal member 399 and a distal end portion of the spool 396 is projected from the spool projecting hole 400 in a slidably manner in the fore-and-aft direction.

Further, the spool 396 is resiliently biased by a compression spring 401 in the projecting direction.

In this manner, by mounting the valve cover body 387 on the hydraulic circuit body 341 which is detachably mounted on the lift arm support body 339 and by housing the hydraulic control valve 342 in the inside of the valve cover body 387, it is possible to perform the performance/function inspection of the hydraulic control valve 342 as a single unit before mounting the hydraulic circuit body 341 and the valve cover body 387 on the lift arm support body 339.

As a result, it is possible to realize the easiness of the performance/function inspection, the miniaturization of the inspection device, and easiness of handling which requires human power.

Further, with respect to the valve cover body 387, as shown in FIG. 13, FIG. 17 and FIG. 18, the hydraulic circuit body 341 is mounted on the hydraulic circuit body support member 340 and a lower portion 402 of the valve cover body 387 is arranged in the inside of the transmission casing 46 in a state that the valve cover body 387 extends downwardly from the hydraulic circuit body 341.

In this manner, by mounting the hydraulic circuit body 341 on the differential gear casing 55 by way of the lift arm support body 339, since the sealing of the mounting surface of the lift arm support body 339 on the differential gear casing 55 becomes one place and hence, the conventional sealing method can be adopted.

Further, since the lower portion 402 of the valve cover body 387 is arranged in the inside of the differential gear casing 55, it is possible to set a height above a ground of the hydraulic circuit body 341 at a low level whereby it is possible to largely ensure the degree of freedom in designing a mounting height of a driver's seat which is arranged right above the hydraulic circuit body 341.

Further, the spool 396 of the above-mentioned hydraulic control valve 342 can be manipulated using an elevating/lowering lever 404 (see FIG. 15) by way of a spool actuator 403 which is formed on a rear portion of the hydraulic circuit body support member 340 and, at the same time, the stopping of elevating/lowering can be performed by a feedback link mechanism 405.

That is, as shown in FIG. 13, FIG. 15 and FIG. 16, in an operating member insertion hole 406 which is formed in the rear portion of the hydraulic circuit body support member 340, the rod-like spool actuator 403 which has an axis thereof extended in the fore-and-aft direction is inserted in a slidable manner in the fore-and-aft direction, and the spool actuator 403 is arranged to face the spool 396 of the hydraulic control valve 342 on the same axis as the spool 396 in the fore-and-aft direction.

Further, a rear portion of the spool actuator 403 is supported on the mounting member 343 by way of an operating member support body 407, a center portion of a tilting member 408 which extends in the lateral direction is pivotally supported on a rear end portion of the spool actuator 403 using a pivotally supporting pin 409 which has an axis thereof directed vertically, left and right-side engaging pins 410, 411 which are respectively formed on left and right-side end portions of the tilting member 408 are formed in a state that the engaging pins 410, 411 project upwardly. Further, a left-side engaging operating pin 412 of the feedback link mechanism 405 is engaged with the left-side engaging pin 410 from behind, while a right-side engaging operating pin 413 which is interlockingly connected with the elevating/lowering lever 404 is engaged with a right-side engaging pin 411 from behind.

Further, the feedback link mechanism 405 is constituted as follows. A left-side boss portion 414 which extends in the lateral direction is formed on a rear left-side portion of the mounting member 343, a left-side interlocking shaft 415 is inserted in the left-side boss portion 414, a proximal end portion of an interlocking arm 416 is mounted on a left-side end portion of the left-side interlocking shaft 415, a distal end portion of the connecting rod 417 is connected to a distal end portion of the interlocking arm 416 in a state that the connecting position is adjustable, and a rear end portion of the connecting rod 417 is connected with a distal end portion of an interlocking member 418 which is formed on a left-side end portion of the lift arm support shaft 109 in a state that the interlocking member 418 is projected upwardly. Numerals 419, 420 indicate connecting pins and numeral 421 indicates a fixing bolt.

On the other hand, a left-side interlocking projecting member 422 is formed on a right-side end portion of the left-side interlocking shaft 415 in a state that the left-side interlocking projecting member 422 projects downwardly, while the above-mentioned left-side engaging operating pin 412 is formed on a lower end portion of the left-side interlocking projecting member 422 in a state that the left-side engaging operating pin 412 projects rightwardly from the lower end portion of the left-side interlocking projecting member 422.

Further, a right-side boss portion 423 which extends in the lateral direction is formed on a rear right-side portion of the mounting member 343, aright-side interlocking shaft 424 is inserted in the right-side boss portion 423, and a proximal end portion of the above/mentioned elevating/lowering lever 404 is interlockingly connected with a right-side end portion of the right-side interlocking shaft 424. On the other hand, a right-side interlocking projecting member 425 is formed on a left-side end portion of the right-side interlocking shaft 424 in a state that the right-side interlocking projecting member 425 projects downwardly, while the above-mentioned right-side engaging operating pin 413 is formed on a lower end portion of the right-side interlocking projecting member 425 in a state that the right-side engaging operating pin 413 projects leftwardly from the lower end portion of the right-side interlocking projecting member 425.

Here, in the same manner as the above-mentioned main/sub transmission levers 85, 142, the elevating/lowering lever 404 is arranged on a right side of the driver's seat 283 in a concentrated manner so as to ensure the favorable operability of these levers 85, 142, 404.

In this manner, when the elevation manipulation is performed by rotating the elevating/lowering lever 404 rearwardly, the right-side engaging operating pin 413 is engaged with the right-side engaging pin 411 from behind and pushes a right-side end portion of the tilting member 408 forwardly by way of the right side engaging pin 411.

Here, since the left-side end portion of the tilting member 408 is fixed by the left-side engaging operating pin 412 by way of the left-side engaging pin 410, the spool actuator 403 which is connected to a center portion of the tilting member 408 using a pivotally supporting pin 409 is slidably moved frontwardly so as to allow the spool 396 to slide forwardly against a resilient biasing force of the compression spring 401.

As a result, the valve body 395 is operated toward the elevation side so as to open the valve, and the pressurized oil is supplied under pressure to the lift cylinders 351, 351 so as to extend both lift cylinders 351, 351 whereby the lift arms 110, 110 which are interlockingly connected with the respective lift cylinders 351, 351 are rotated upwardly.

Then, the feedback link mechanism 405 is interlockingly operated with the upward rotation of the lift arms 110, 110 and hence, the left-side engaging operating pin 412 of the feedback link mechanism 405 is rotated rearwardly and the fixing of the left-side end portion of the tilting member 408 by way of the left-side engaging pin 410 is released. As a result, the spool 396 is slidably moved rearwardly due to the resilient biasing force of the compression spring 401 and, at a point of time that the spool returns to a neutral position, the valve body 395 performs the valve-closing operation so as to stop the inflow of the pressurized oil into the lift cylinders 351, 351.

Further, when the lowering manipulation is performed by rotating the elevating/lowering lever 404 frontwardly, the right-side engaging operating pin 413 is separated from the right-side engaging pin 411.

As a result, due to the resilient biasing force of the compression spring 401, the spool 396 is slidably moved rearwardly and hence, the valve body 395 performs the valve-opening operation to the lowering side for lowering the lift cylinders 351, 351. The pressurized oil which is supplied to both lift cylinders 351, 351 under pressure flows out from the lift cylinders 351, 351 and hence, both lift cylinders 351, 351 are contracted whereby the lift arms 110, 110 which are interlockingly connected with the respective lift cylinders 351, 351 perform the lowering rotation.

Here, since the left-side end portion of the tilting member 408 is fixed by the left-side engaging operating pin 412 by way of the left-side engaging pin 410, the spool actuator 403 which is connected with the center portion of the tilting member 408 by way of the pivotally supporting pin 409 is slidably moved rearwardly whereby the right-side end portion of the tilting member 408 is moved rearwardly by way of the right-side engaging pin 411.

Then, the feedback link mechanism 405 is interlockingly operated with the downward rotation of the lift arms 110, 110 and hence, the left-side engaging operating pin 412 of the feedback link mechanism 405 is rotated frontwardly and pushes the left-side end portion of the tilting member 408 frontwardly by way of the left-side engaging pin 410 and hence, the spool 396 is slidably moved frontwardly against the resilient biasing force of the compression spring 401 and, at a point of time that the spool 396 returns to a neutral position, the valve body 395 performs the valve-closing operation so as to stop the outflow of the pressurized oil to the lift cylinders 351, 351.

Here, in the feedback link mechanism 405, by adjusting the connecting position between the distal end portion of the interlocking arm 416 and the distal end portion of the connecting rod 417, it is possible to adjust the neutral position of the spool 396.

Further, as shown in FIG. 11, an opening portion 111 is formed in a rear end of the differential gear casing 55 and a PTO transmission portion 6 is mounted in the opening portion 111. The constitution of the PTO transmission portion 6 is explained later.

(Differential Mechanism 48)

The differential mechanism 48 is, as shown in FIG. 11 and FIG. 12, interposed between the above-mentioned sub transmission shaft 116 and the pair of left and right rear axles 105, 105. An output bevel gear 180 is integrally formed on a distal end portion (a rear end portion) of the sub transmission shaft 116 which is extended rearwardly than the shaft support wall 100, while rear axle input gears 181, 181 are mounted on proximal end portions of the respective rear axle 105, 105. Then, the output bevel gear 180 is interlockingly connected with the respective rear axle input gears 181, 181 by way of the differential mechanism 48.

That is, the differential mechanism 48 is configured as follows. A large speed reduction gear 183 which is meshed with the above-mentioned output bevel gear 180 is mounted on an outer peripheral surface of a differential gear casing 182. On the other hand, in the inside of the differential gear casing 182, a pair of front and rear small differential gears 185, 185 are rotatably mounted by way of a small differential gear support shaft 184 which extends in the fore-and-aft direction and, at the same time, a pair of left and right large differential gears 187, 187 are mounted by way of a pair of left and right large differential gear support shafts 186, 186 extending in the lateral direction. The respective large differential gears 187, 187 are meshed with both small differential gears 185, 185.

Then, on cylindrical communication connection members 188, 188 which are integrally formed on left and right side portions of the differential gear casing 182, a pair of left and right cylindrical shaft support bodies 189, 189 which have axes thereof directed in the lateral direction are detachably fitted thus communicably connecting the cylindrical communication connection members 188, 188 and the cylindrical shaft support bodies 189, 189 with each other. The above-mentioned large differential gear support shafts 186, 186 are inserted into and are supported by the respective left and right cylindrical shaft support bodies 189, 189 after passing through the respective cylindrical communication connection members 188, 188. On portions of the respective large differential gear support shafts 186, 186 which project from the left and right cylindrical shaft support bodies 189, 189, power transmission gears 190, 190 which are respectively meshed with the above-mentioned rear axle input gears 181, 181 are mounted. Further, distal end portions of the respective large differential gear support shafts 186, 186 are detachably connected to the traveling brakes 192, 192 of the brake portions described later.

In this manner, a rotational force which is transmitted to the sub transmission shaft 116 is transmitted to the respective rear wheels 9, 9 through a path of the output bevel gear 180 which is integrally formed on a distal end portion (a rear end portion) of the sub transmission shaft 116→the large speed reaction gear 183→the differential gear casing 182→the small differential gear support shaft 184→the respective small differential gears 185, 185→the respective large differential gears 187, 187→the respective large differential gear support shafts 186, 186→the respective power transmission gears 190, 190→the respective rear axle input gears 181, 181→the respective rear axles 105, 105→the respective rear wheels 9, 9.

Further, the pair of left and right cylindrical shaft support bodies 189, 189 are fitted into mounting opening portions 194, 194 which are formed in left and right side walls 55*a*, 55*b* of the sub transmission casing 54 from outer sides and, at the same time, are detachably mounted on the mounting opening portions 194, 194 using mounting bolts 195, 195. The differential gear casing 182 is detachably extended between both cylindrical shaft support bodies 189, 189.

Then, the respective cylindrical shaft support bodies 189, 189 can be taken out from the sub transmission casing 54 by pulling out the respective cylindrical shaft support bodies 189, 189 in the sideward direction toward the outside from the mounting opening portions 194, 194 after removing the mounting bolts 195, 195. Here, it is also possible to remove the respective large differential gear support shafts 186, 186 from the differential gear casing 182 by pulling out the respective large differential gear support shafts 186, 186 integrally with the respective cylindrical shaft support bodies 189, 189.

Accordingly, the differential gear casing 182 which is detachably extended between both cylindrical shaft support bodies 189, 189 can be, after removing the respective cylindrical shaft support bodies 189, 189, taken out from a maintenance opening portion 106 formed in a ceiling portion of the sub transmission casing 54.

Further, the brake portion 191 is configured such that a traveling brake 192 is arranged in the inside of a brake case 196 and the braking/releasing manipulation of the traveling brake 192 is performed using a brake manipulating lever 198 by way of a brake operating member 197. Numeral 199 indicates a brake lever support shaft which is pivotally supported on the brake case 196.

Further, the brake case 196 is detachably mounted in a state that the brake case 196 is extended between a side wall of the sub transmission casing 54 and a proximal portion of an outer peripheral surface of the rear axle case 8. By removing the brake case 196 from the side wall and the proximal portion, it is possible to remove the traveling brake 192 together with the brake case 196 from a distal end portion of the large differential gear support shaft 186.

Next, the above-mentioned front wheel drive power takeout portion 103 is explained in conjunction with FIG. 4 and FIG. 9.

(Front-Wheel-Drive Power Takeout Portion 103)

The front wheel drive power takeout portion 103 is configured as follows as shown in FIGS. 4 and 9. That is, a takeout portion case 160 is mounted in the opening portion 102 which is formed on a bottom portion of the sub transmission casing 54, a front wheel drive shaft 164 which has an axis thereof directed in the fore-and-aft direction is extended in the inside of the take out portion case 160 by way of a pair of front and rear bearings 162, 163, an input gear 165 is mounted on a midst portion of the front wheel drive shaft 164, and first and second intermediate gears 167, 168 are interposed between the input gear 165 and the output gear 166 which is mounted on a rear portion of the sub transmission shaft 116.

Here, the first intermediate gear 167 is rotatably mounted on a PTO-system power transmission shaft 169 described later by way of a bearing 170 and, at the same time, the second intermediate gear 168 is mounted on a gear support shaft 173 such that the gear support shaft 173 is extended between a pair of front and rear gear support members 171, 172 which are formed in the inside of the sub transmission casing 54 in a projecting manner and the second intermediate gear 168 is rotatably mounted on the gear support shaft 173 by way of a bearing 174.

Further, the output gear 166, the first intermediate gear 167, the second intermediate gear 168 and the input gear 165 are connected with each other in an interlocking manner in a state that these gears are meshed with each other in series.

Further, a distal end portion 175 of the front wheel drive shaft 164 is projected forwardly from the takeout portion case 160 and the distal end portion 175 is interlockingly connected with an input shaft (not shown in the drawing) formed in the front axle case by way of a power transmission shaft or the like.

In this manner, a rotational force of the sub transmission shaft 116 is transmitted to the front wheels 7, 7 through a path of the output gear mounted on the sub transmission shaft 116→the first intermediate gear 167→the second intermediate gear 168→the input gear 165→the front wheel drive shaft 164→the power transmission shaft or the like→the input shaft→the front axles→the front wheels 7, 7 thus enabling four-wheel-drive traveling.

Further, in this embodiment, the input gear 165 is fitted on a midst portion of the front wheel drive shaft 164 in spline fitting so that the input gear 165 can be shifted between a position where the input gear 165 is meshed with the second intermediate gear 168 and a position where the meshing is released and, at the same time, the shift manipulation of the input gear 165 can be performed using a shift manipulation mechanism (not shown in the drawing) outside the takeout portion case 160.

Due to such a constitution, by performing the shift manipulation which allows the input gear 165 to be meshed with the second intermediate gear 168, it is possible to perform the above-mentioned four-wheel-drive traveling, while by performing the shift manipulation which releases the meshing of the input gear 165 with the second intermediate gear 168, the two-wheel-drive traveling which uses only the rear wheel driving can be performed whereby by suitably performing the changeover manipulation of the four-wheel-drive traveling and two-wheel-drive traveling in response to the operation conditions, it is possible to efficiently perform the operation.

(Driving Portion 5)

In the driving portion 5, as shown in FIG. 1, a steering column 280 is mounted upright at a position behind the prime mover portion 2 and, at the same time, at a position above the clutch portion 3, a steering wheel 282 is mounted on an upper end portion of the steering column 280 by way of a wheel support shaft 281, a driver's sheet 283 is arranged at a position behind the steering wheel 282, and the above-mentioned main transmission lever 85 and the sub transmission lever 142 are arranged in a concentrated manner at a position arranged on a side of the driver's sheet 283.

[PTO Transmission Portion 6]

In the PTO transmission portion 6, as shown in FIG. 11, in an opening portion 111 which is formed in a rear end of the differential gear casing 55 of the transmission casing 45, a PTO case 200 is detachably mounted, and a PTO transmission mechanism 201 is arranged in the inside of the PTO case 200.

The respective constitutions of (the PTO case 200) and (PTO transmission mechanism 201) are explained in this order in conjunction with FIG. 11.

(PTO Case 200)

The PTO case 200 has, as shown in FIG. 11, the three-split constitution consisting of a front case forming body 202, an intermediate case forming body 203 and a rear case forming body 204, wherein the respective case forming bodies 202, 203, 204 are detachably connected with each other, the front case forming body 202 and the intermediate case forming body 203 are arranged in a state that these case forming bodies are housed in the inside of the differential gear casing 55, and the rear case forming body 204 is arranged in a state that the rear case forming body 204 is bulged rearwardly from the differential gear casing 55.

Further, a flange-like mounting member 205 is integrally formed by molding on a peripheral portion of a front end of the rear case forming body 204, the mounting member 205 is brought into contact with a peripheral portion of a rear end of the differential gear casing 55 from behind and, at the same time, the mounting member 205 is mounted on the differential gear casing 55 using a mounting bolt 206 which has an axis thereof directed in the fore-and-aft direction.

In this manner, the PTO case 200 is detachably mounted in the opening portion 111 which is formed in the rear end of the differential gear casing 55 and hence, in a state that the PTO case 200 is removed from the differential gear casing 55 of the transmission casing 45, it is possible to easily perform the assembling operation and maintenance operation of the PTO transmission mechanism 201 which is housed in the inside of the PTO case 200.

Further, in the PTO case 200, the front case forming body 202 and the intermediate case forming body 203 are mounted in a state that the front case forming body 202 and the intermediate case forming body 203 are housed in the inside of the differential gear casing 55 of the transmission casing 45 and hence, the transmission casing 45 can be miniaturized or made compact.

In the inside of the front case forming body 202, an input shaft projection opening portion 207 for receiving an input shaft 230 is formed in a state that the opening portion 207 opens in the fore-and-aft direction, and a transmission-shaft-front-portion receiving portion 208 is formed at a position above the above-mentioned input shaft projection opening portion 207.

A shaft receiving member 209 which receives a front end portion of the PTO shaft 232 is provided in the inside of the intermediate case forming body 203, and the shaft receiving member 209 forms a PTO shaft front-portion receiving portion 212 which opens in the fore-and-aft direction in a midst portion thereof.

In this manner, the shaft receiving member 209 is arranged on a front-side end-surface 201 side of the intermediate case forming body 203 and hence, structure of a mold for forming the intermediate case forming body 203 by molding can be simplified whereby the cost of the mold can be reduced.

Further, a front-side end surface 201 of the intermediate case forming body 203 and a front-side end surface 211 of the bearing member 209 are formed coplanar and hence, it is possible to simply and surely perform the forming by molding and the machining of the intermediate case forming body 203.

A PTO shaft projection opening portion 214 is formed in the rear case forming body 204 in a state that the PTO shaft projection opening portion 214 is opened in the fore-and-aft direction, and a transmission-shaft rear-portion receiving portion 215 is formed at a position above the PTO shaft projection opening portion 214.

Further, the input shaft projection opening portion 207 formed in the front case forming body 202, the PTO-shaft front-portion receiving portion 212 which is formed in the intermediate case forming body 203 and, the PTO shaft projection opening portion 214 which is formed in the rear case forming body 204 are formed communicably with each other on the same axis which extends in the fore-and-aft direction.

Further, the transmission-shaft front-portion receiving portion 208 which is formed in the front case forming body 202 and the transmission-shaft rear-portion receiving portion 215 which is formed in the rear case forming body 204 are arranged to face each other in an opposed manner in the fore-and-aft direction.

Here, pivotally supporting members 345, 345 of the above-mentioned lift arm support body 339 mount a top link bracket 216 for pivotally supporting and connecting front end portions of the top links 12 thereon, wherein the top link bracket 216 includes a plate-like mounting seat 217 which is brought into face contact with rear surfaces of both pivotally supporting members 345, 345 and is mounted by a mounting bolt 220, and a pair of left and right plate-like pivotally supporting and connection members 218, 218 which are formed on a rear surface of the mounting seat 217 in a state that the pivotally supporting and connection members 218, 218 project rearwardly from the rear surface of the mounting seat 217. In FIG. 15, numeral 219 indicates connecting holes which allow the insertion of the mounting bolt 220 therein.

Further, on left and right side walls of the rear case forming body 204, lift cylinder support shafts 211, 211 which constitute a lift cylinder mounting portion are formed in a state that these lift cylinder support shafts 221, 221 project in the outer sideward direction, and the lift cylinders 351, 351 which perform the extension-and-contraction operation in the vertical direction are interposed between the respective cylinder support shafts 221, 221 and the midst portion of the above-mentioned lift arms 350, 350. Numeral 223 indicates a lift cylinder connection pin and numeral 224 indicates a lift cylinder pivotally-supporting connection member.

In such a manner, the pair of left and right lift cylinders 351, 351 which perform the extension-and-contraction operation in the vertical direction are arranged at left and right sideward positions of the rear case forming body 204 and, at the same time, lower end portions of the respective lift cylinders 351, 351 are supported on the rear case forming body 204 by way of the lift cylinder support shafts 221, 221. Accordingly, both lift cylinders 351, 351 can easily assume a posture in which both lift cylinders 351, 351 are arranged upright or substantially upright whereby strokes of the respective lift cylinders 351, 351 can be made small thus realizing the miniaturization of the respective lift cylinders 351, 351 and the reduction of the power loss.

Further, since lower end portions of the respective lift cylinders 351, 351 are supported on the rear case forming body 204 by way of the lift cylinder support shafts 221, 221, it is possible to firmly support the respective lift cylinders 351, 351.

(PTO Transmission Mechanism 201)

The PTO transmission mechanism 201 is configured as shown in FIG. 11, wherein in the inside of the above-mentioned PTO case 200, an input shaft 230, a transmission shaft 231 and the PTO shaft 232 which respectively have axes thereof directed in the fore-and-aft direction are arranged.

That is, the input shaft 230 is rotatably supported in the input shaft projection opening portion 207 formed in the front case forming body 202 of the PTO case 200 by way of bearings 233, 234, while the input shaft 230 has a distal end portion 235 thereof projected forwardly and mounts an output gear 236 on a rear end portion thereof.

Further, between the transmission-shaft front-portion receiving portion 208 which is formed in the front case forming body 202 and the transmission-shaft rear-portion receiving portion 215 which is formed in the rear case forming body 204, the transmission shaft 231 is rotatably supported by way of bearings 237, 238, a large-diameter input gear 239, a second transmission gear 240 and a first transmission gear 241 are coaxially and integrally formed with the transmission shaft 231 in order from a front side to a rear side, wherein the large-diameter input gear 239 is meshed with the output gear 236 mounted on the above-mentioned input shaft 230.

Further, between the PTO-shaft front-portion receiving portion 212 which is formed in the intermediate case forming body 203 and the PTO-shaft projection opening portion 214 which is formed in the rear case forming body 204, the PTO shaft 232 is rotatably supported by way of bearings 242, 243.

Further, a shift gear body 244 is mounted on the PTO shaft 232 in spline fitting such that the shift gear body 244 is shifted slidably in the axial direction and, at the same time, an input gear 267 is rotatably mounted on the PTO shaft 232. While a large-diameter shift gear 268 and a small-diameter shifter gear 269 are mounted on the shift gear body 244, on a front surface of the input gear 267, a fitting/meshing gear 270 which is meshed with the above-mentioned small-diameter shift gear 269 fitted in the fitting/meshing gear 270 is formed.

Further, the shift gear body 244 can, with an actuation of the PTO transmission manipulating mechanism 272, perform the second PTO transmission manipulation in which the large-diameter shift gear 268 is meshed with the above-mentioned second transmission gear 240 and the first PTO transmission manipulation in which the small-diameter shift gear 269 is fitted in and meshed with the fitting/meshing gear 270.

Further, the PTO shaft 232 has a distal end portion (a rear end portion) 273 thereof projected rearwardly from the PTO-shaft projection opening portion 214 which is formed in the rear case forming body 204.

In this manner, according to this embodiment, the input shaft 230 is supported on the front case forming body 202, the transmission shaft 231 is supported between the front case forming body 202 and the rear case forming body 204, and the PTO shaft 232 is supported between the intermediate case forming body 203 and the rear case forming body 204 and hence, the degree of freedom of the arrangement of these shafts 230, 231, 232 can be increased and, at the same time, these shafts 230, 231, 232 can be arranged in a compact form. Further, it is possible to easily and surely perform the meshing and the connection of gears which are mounted on the respective shafts 230, 231, 232.

Further, the PTO case 200 adopts the three-split constitution consisting of the front case forming body 202, the intermediate case forming body 203 and the rear case forming body 204 and hence, the large-diameter input gear 239, the second transmission gear 240 and the first transmission gear 241 can be simply assembled between the front case forming body 202 and the rear case forming body 204 by way of the transmission shaft 231 whereby the transmission shaft 231 and the respective gears 239, 240, 241 can be easily and surely arranged thus enhancing the efficiency of the assembling operation of the PTO transmission mechanism 201.

Further, the PTO shaft 232 is provided with a clutch mechanism 275, wherein the clutch mechanism 275 performs the connection/disconnection manipulation using a clutch manipulation mechanism 276.

Further, a distal end portion 235 of the input shaft 230 is, as shown in FIG. 4, interlockingly connected with the above-mentioned outer drive shaft 20 by way of the PTO-system power transmission shaft 169 thus constituting a PTO-system power transmission mechanism 52, while the PTO-system power transmission shaft 169 is arranged in the inside of the transmission casing 45 with an axis thereof directly in the fore-and-aft direction from a front portion to a rear portion thereof.

(PTO-System Power Transmission Shaft 169)

The PTO-System Power Transmission Shaft 169 is, as shown in FIG. 4, constituted by connecting first to fourth divided power transmission shafts 245, 246, 247, 248 in the fore-and-aft direction.

Figure 6:
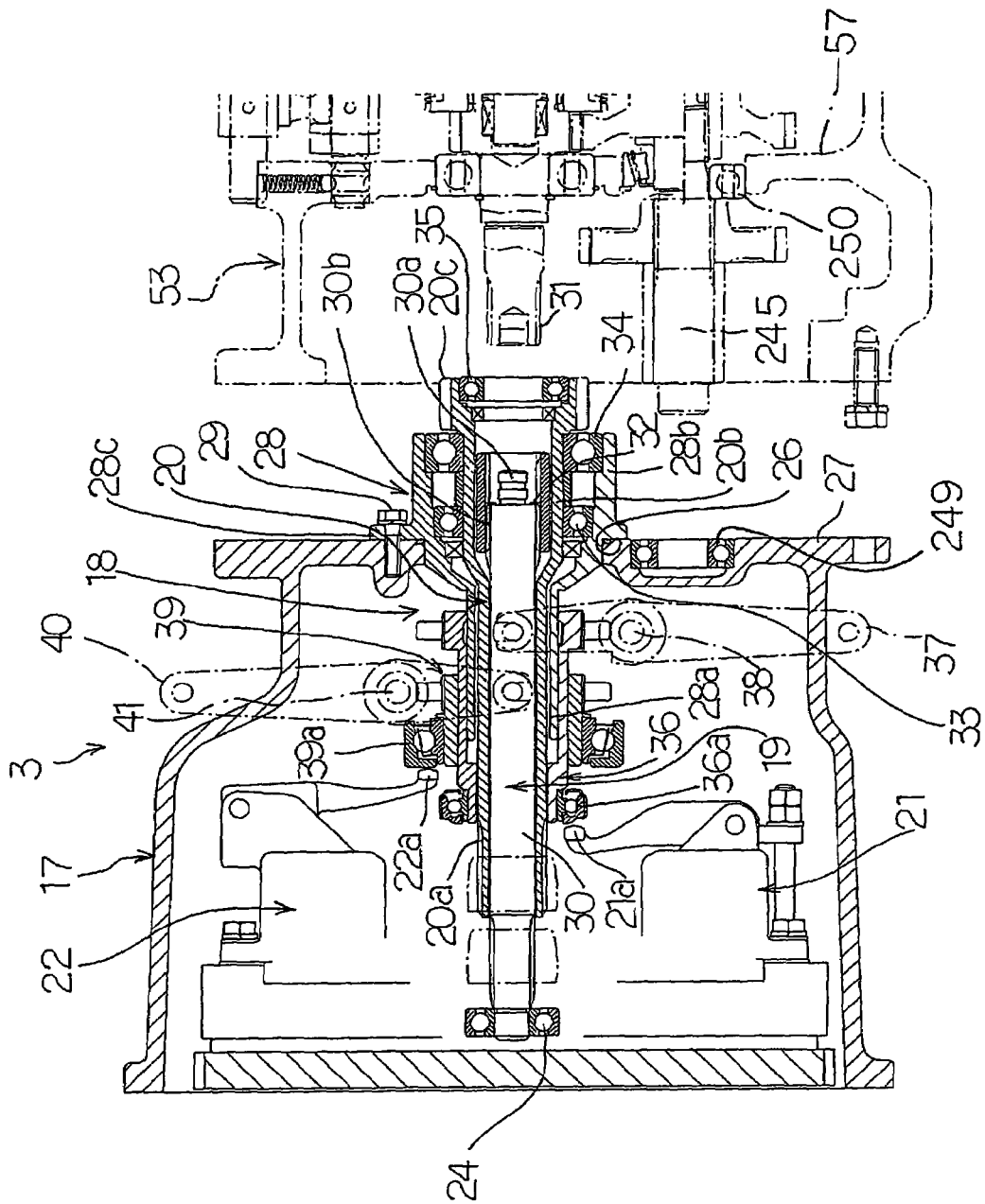
FIG. 6 is an explanatory cross-sectional side view of the clutch part

Further, the first divided power transmission shaft 245 is, as shown in FIG. 4 and FIG. 6, rotatably extended between the rear wall 27 of the clutch housing 17 and the above-mentioned inner support wall 57 by way of bearings 249, 250, and an input gear 244 is mounted on a midst portion of the first divided power transmission shaft 245, and the input gear 244 is meshed with the PTO drive gear 20c.

Further, the second divided power transmission shaft 246 has, as shown in FIG. 4, amidst portion thereof rotatably supported on the above-mentioned shaft support wall forming body 50 by way of a bearing 251 and, at the same time, has a front end portion thereof connected to a rear end portion of the above-mentioned first divided power transmission shaft 245 by way of a first cylindrical connecting body 252.

The third divided power transmission shaft 247 has, as shown in FIG. 4 and FIG. 9, amidst portion thereof rotatably supported on the shaft support body 118 by way of a bearing 253 and, at the same time, has a front end portion thereof connected to a rear end portion of the above-mentioned second divided power transmission shaft 246 by way of a second cylindrical connecting body 254.

The fourth divided power transmission shaft 248 has, as shown in FIG. 4 and FIG. 11, a front end portion thereof connected with a rear end portion of the above-mentioned third divided power transmission shaft 247 by way of a one way clutch 255 and, at the same time, has a rear end portion thereof connected to a distal end portion 235 of the above-mentioned input shaft 230 by way of a third cylindrical connecting body 256.

Here, the one way clutch 255 is constituted of a front clutch forming body 257 which is mounted on the rear end portion of the third divided power transmission shaft 247 and a rear clutch forming body 258 which is mounted on the front end portion of the fourth divided power transmission shaft 248, wherein a meshing member 259 which is formed on a rear surface of the front clutch forming body 257 in a projecting manner and a meshing member 260 which is formed on a front surface of the rear clutch forming body 258 are meshed with each other in a state that these meshing members 259, 260 are meshed with each other in an opposed manner in the fore-and-aft direction. That is, in the normal rotation, both meshing members 259, 260 are engaged with each other so that the third and fourth divided power transmission shafts 247, 248 are rotated integrally in the normal rotational direction, while in the reverse direction, both meshing members 259, 260 are prevented from engaging with each other.

In this manner, the power transmitted to the outer drive shaft 20 from the engine 15 is transmitted to the input shaft 230 through a path of the PTO drive gear 20c which is integrally formed by molding with the outer drive shaft 20→the input gear 244→the first divided power transmission shaft 245→the first cylindrical connecting body 252→the second divided power transmission shaft 246→the second cylindrical connecting body 254→the third divided power transmission shaft 247→the one-way clutch 255→the fourth divided power transmission shaft 248→the third cylindrical connecting body 256→the input shaft 230.

Further, when the PTO transmission mechanism 201 receives the first PTO transmission manipulation, the power transmitted to the input shaft 230 is transmitted to the PTO shaft 232 through a path of the output gear 236→the large-diameter input gear 239→the transmission shaft 231 →the first transmission gear 240→the large-diameter shift gear 268 of the shift gear body 244→the PTO shaft 232 and, thereafter, the power is taken out from the PTO shaft 232 so as to drive various working machines.

Further, when the PTO transmission mechanism 201 receives the second PTO transmission manipulation, the power transmitted to the input shaft 230 is transmitted to the PTO shaft 232 through a path of the output gear 236→the large-diameter input gear 239→the transmission shaft 231→the second transmission gear 241→the input gear 267→the fitting/meshing gear 270 of this input gear 267→the small-diameter shift gear 269 of the shift gear body 244→the PTO shaft 232 and, thereafter, the power is taken out from the PTO shaft 232 so as to drive various working machines.

Here, even when the PTO shaft 232 is rotated reversely upon receiving a load from the various working machines and the power is transmitted through a path of the input shaft 230→the third cylindrical connecting body 256→the fourth divided power transmission shaft 248, since the one-way clutch 255 is interposed between the fourth divided power transmission shaft 248 and the third divided power transmission shaft 247, the power is not transmitted from the fourth divided power transmission shaft 248 to the third divided power transmission shaft 247.

Accordingly, it is possible to prevent the occurrence of a drawback that the power from the PTO shaft 232 is reversely transmitted to the traveling-system power transmission mechanism including the main transmission mechanism 46 and the traveling-system power transmission mechanism 51 is damaged.

Figure 19:
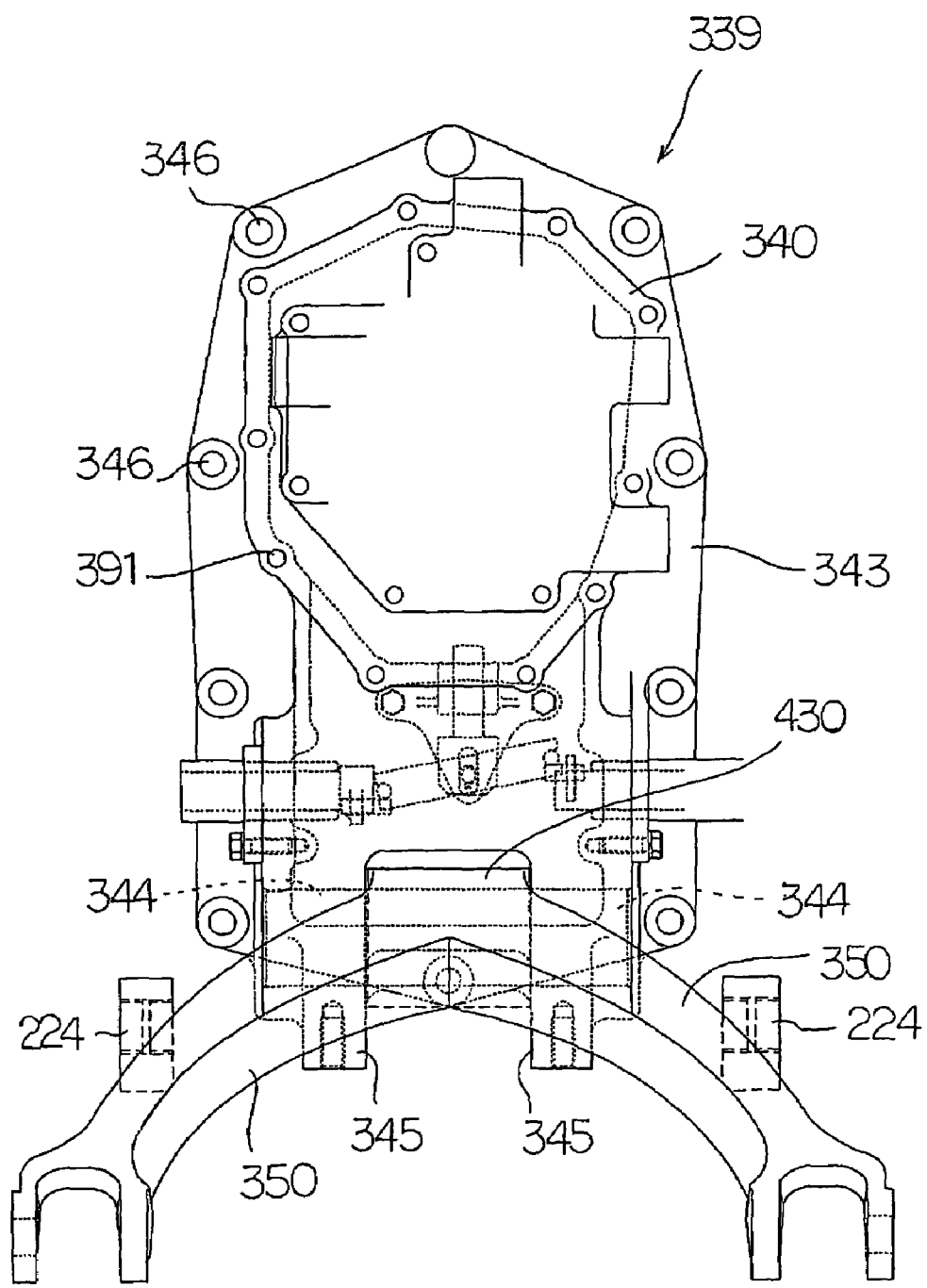
FIG. 19 is a plan view of the lift arm support body of another embodiment.
Figure 20:
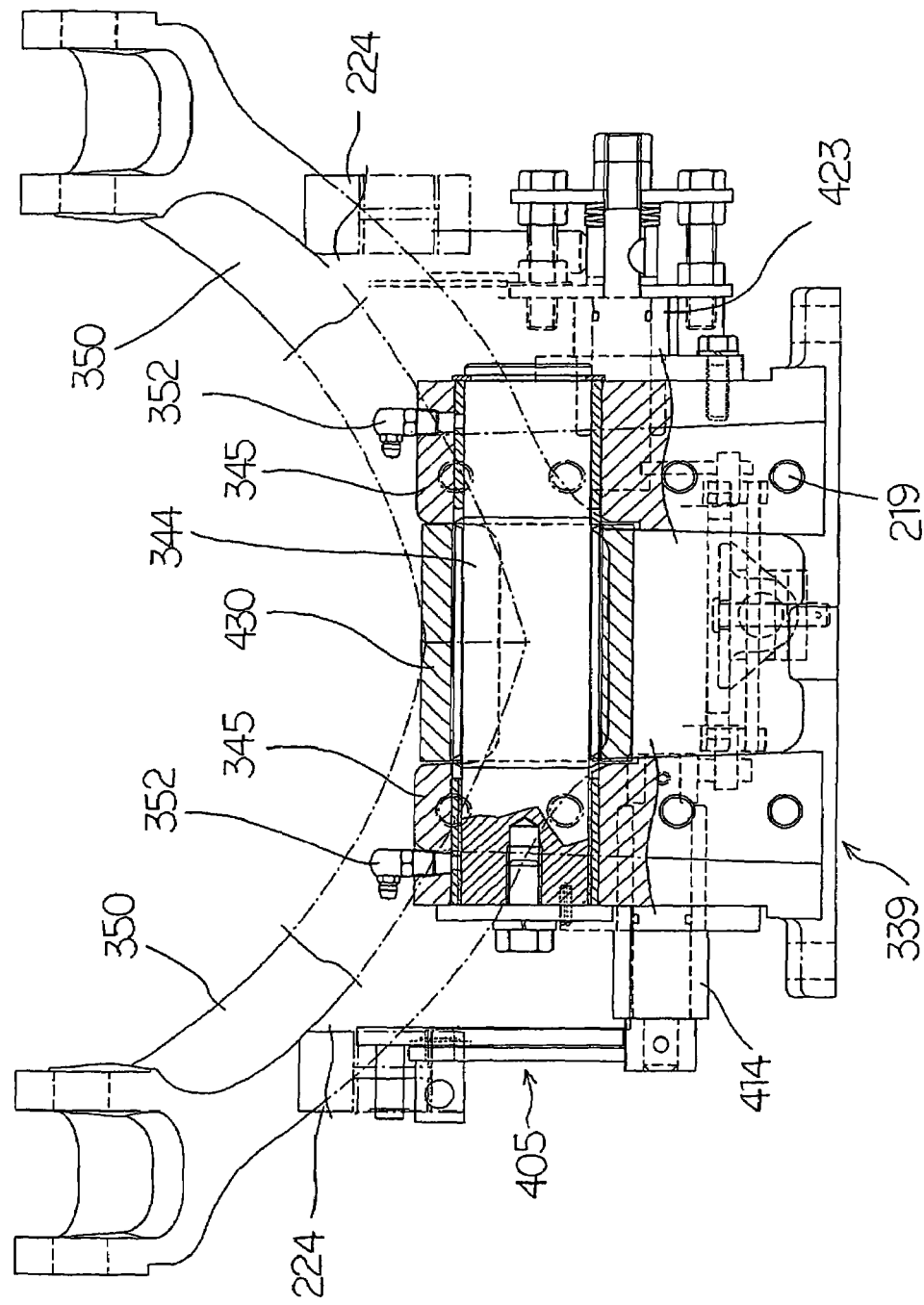
FIG. 20 is a back view with a part cut away of the lift arm support body.

FIG. 19 and FIG. 20 show lift arms 350, 350 which constitute another embodiment. The lift arms 350, 350 have proximal end portions thereof integrally formed by way of a rotary boss portion 430, the rotary boss portion 430 is fitted on a center portion of the lift arm support shaft 344 between a pair of left and right pivotally supporting members 345, 345, and the pair of left and right lift arms 350, 350 are integrally rotated about the lift arm support shaft 344 by way of the rotary boss portion 430.

In this manner, since the pair of left and right lift arms 350, 350 are integrally formed by way of the rotary boss portion 430, it is possible to easily perform the mounting operation of both lift arms 350, 350.

Figure 21:
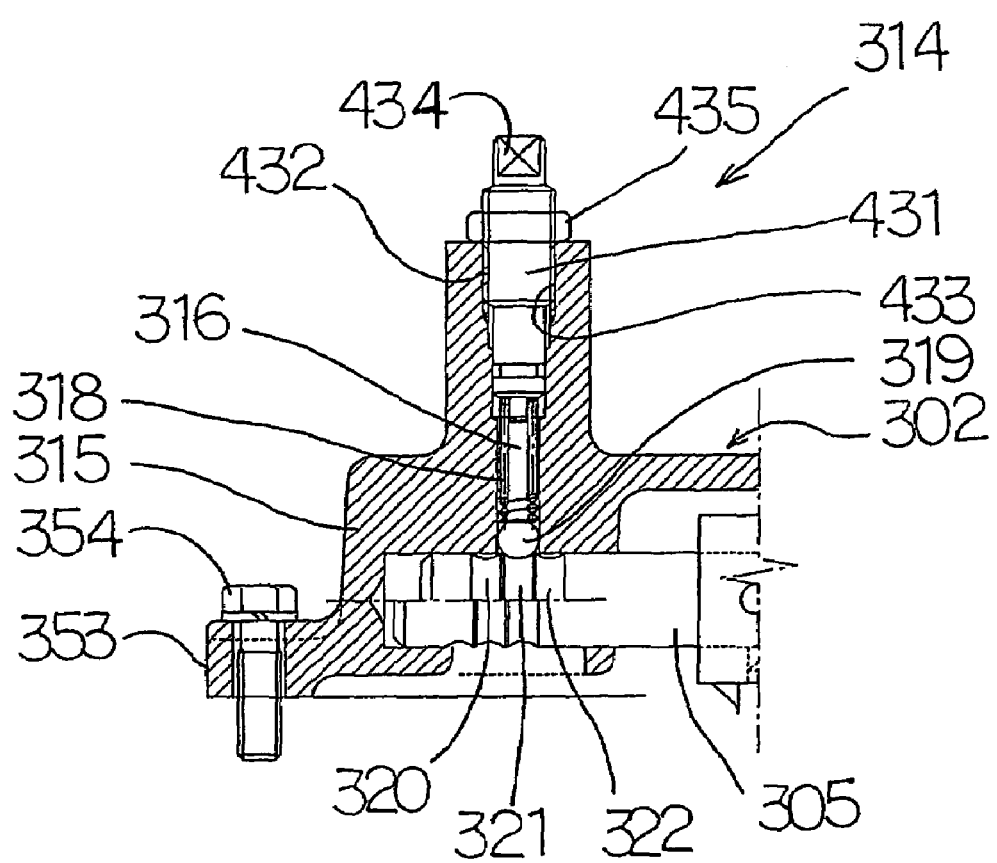
FIG. 21 is an enlarged cross-sectional side view of a branching position temporary fixing portion of another embodiment.

FIG. 21 shows a branch position temporarily holding portion 314 which constitutes another embodiment, wherein an adjusting male thread body 431 which constitutes a temporarily holding strength adjusting portion is provided to the branch position temporarily holding portion 314.

That is, the adjusting male thread body 431 is formed in a rod shape which extends in the vertical direction and a male thread portion 432 is formed on an outer peripheral surface of the adjusting male thread portion 431. A ball accommodating longitudinal hole 316 which extends in the vertical direction is formed in a left-side portion of a ceiling portion 315 of the cover body 302 in a state that the ball accommodating longitudinal hole 316 penetrates the left-side portion, a female thread portion 433 is formed in an inner peripheral surface of an upper portion of the ball accommodating longitudinal hole 316, the adjusting male thread body 431 is threadedly engaged with the female thread portion 433, and a compression spring 318 is interposed between a lower end portion of the adjusting male thread portion 431 and the temporarily holding ball 319.

Further, the adjusting male thread body 431 is formed in the substantially same axial direction with the main/sub transmission levers 85, 142 in a state that the adjusting male thread body 431 projects from the cover body 302 and, at the same time, an adjusting tab member 434 is mounted on a distal end portion (an upper end portion) thereof. Numeral 435 indicates a fixing nut.

In this manner, by pinching the adjusting tab member 434 and rotating the adjusting male thread body 431, it is possible to adjust the temporary holding strength obtained by the temporarily holding ball 319 by adjusting a pushing force of the compression spring 318 to the temporarily holding ball 319.

Accordingly, the operator can perceive the response which satisfies his taste with his hand and hence, the operability of the main transmission lever 85 can be enhanced.

Here, since the branch position temporarily holding portion 314, different from the transmission position temporarily holding portion 323, does not perform the function of preventing the removal of the gear at the time of power transmission and hence, it is unnecessary to hold the temporary holding strength to a fixed value or more whereby it is possible to freely adjust the temporarily holding strength such that the operator can obtain the response which satisfies his taste with his hand.

Further, since the adjusting tab member 434 is formed in a state that the adjusting tab member 434 projects in the substantially same axial direction as the main/sub transmission levers 85, 142, the operator can easily grasp the adjusting tab member 434 from above and, at the same time, it is possible to perform the temporarily holding adjustment by the adjustment tab member 434 smoothly and surely.

Figure 22:
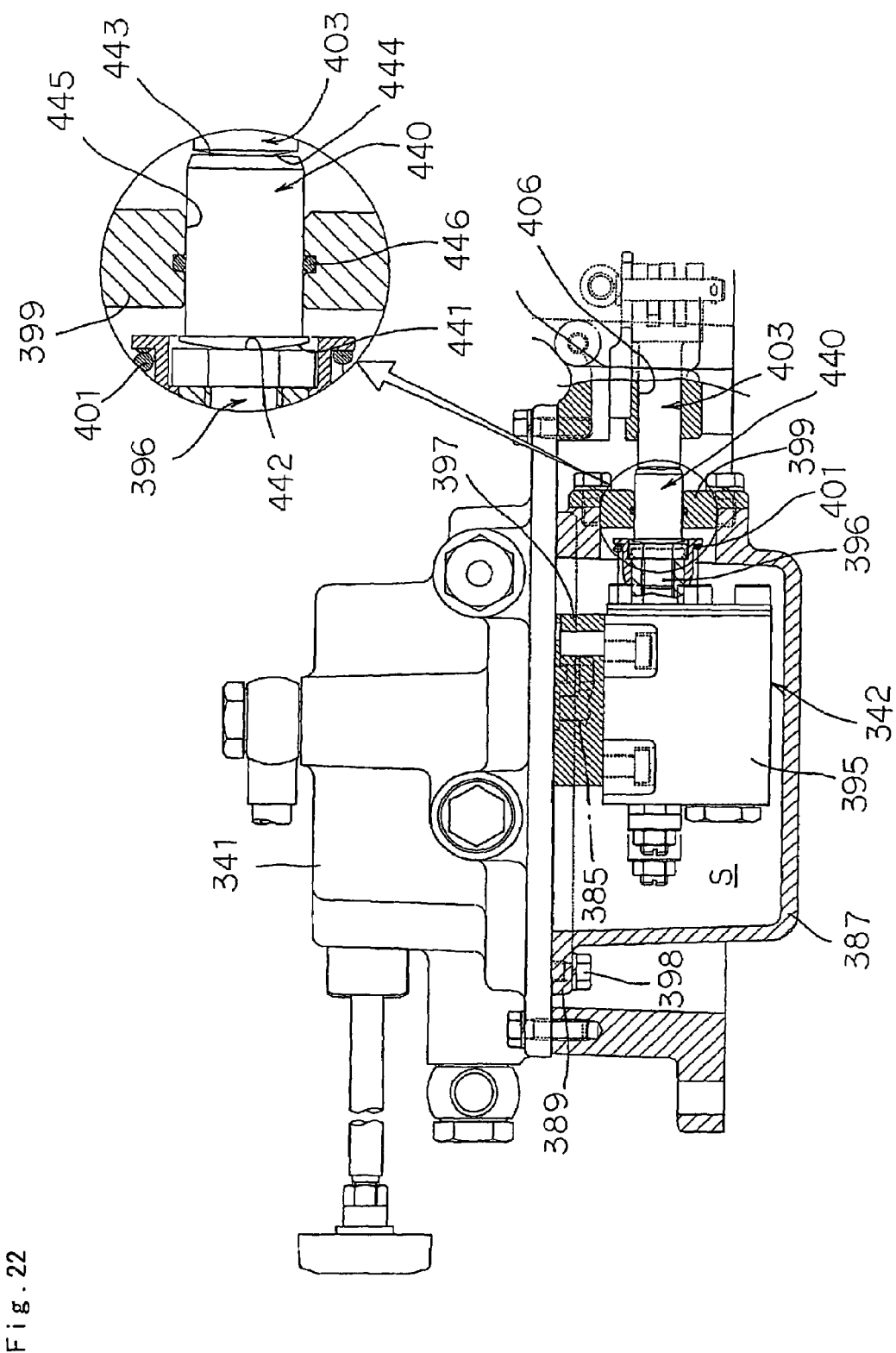
FIG. 22 is an explanatory side view with a part cut away of a hydraulic control valve of another embodiment.

FIG. 22 is an explanatory view with a part cut away of the hydraulic control valve 342 as another embodiment. Although the hydraulic control valve 342 has the same basic structure as the above-mentioned hydraulic control valve 342, the constitution of the hydraulic control valve 342 of this embodiment differs from the constitution of the above-mentioned hydraulic control valve 342 in that a sub spool 440 is interposed between a spool 396 and a spool actuator 403 which is arranged in the rear portion of the hydraulic circuit body support member 340.

That is, the sub spool 440 is formed in a bar-like shape which has an axis thereof extended in the fore-and-aft direction and, a front end surface 441 is brought into contact with a rear end surface 442 of the above-mentioned spool 396, while a rear end surface 443 is brought into contact with a front end surface 444 of the above-mentioned spool actuator 403.

Then, the spool actuator 403 is inserted slidably in the fore-and-aft direction in an actuator insertion hole 406 which is formed in the rear portion of the hydraulic circuit body support member 340.

Further, one portion of the rear wall of the valve cover body 387 is formed by a sealing member 399 which has a sealing structure and a sub spool projecting hole 445 which is opened in the fore-and-aft direction is formed in the center portion of the sealing member 399 and the above-mentioned sub spool 440 is slidably inserted in the fore-and-aft direction in the sub spool projecting hole 445. Numeral 446 indicates a sealing ring.

Further, the spool 396, the sub spool 440 and the spool actuator 403 are arranged on an approximately same axis which extends in the fore-and-aft direction.

Still further, by connecting an elevating/lowering lever (not shown in the drawing) for performing the elevating and lowering manipulation of lift arms 350, 350 interlockingly with the spool actuator 403 and, at the same time, as shown in FIG. 2, by interposing a feedback link mechanism 405 between the spool actuator 403 and the left lift arm 350, the elevation and lowering of the lift arms 350, 350 can be stopped by the feedback link mechanism 405.

That is, when the lift arms are elevated by rotatably manipulating the elevating/lowering lever in the rearward direction, the spool actuator 403 is slidably moved in the frontward direction, whereby the spool 396 is slidably moved forwardly against s resilient biasing force of the compression spring 401 by way of the sub spool 440.

As a result, the valve main body 395 is manipulated to open the valve on the elevation side, the pressurized oil is supplied to the lift cylinders 351, 351 and both lift cylinders 351, 351 are extended, whereby the lift arms 350, 350 which are interlockingly connected to the respective lift cylinders 351, 351 are rotatably elevated.

Then, when the feedback link mechanism 405 is interlocked with the rotatable elevation of the lift arms 350, 350 and the slidable movement of the spool actuator 403 in the frontward direction is released due to the feedback link mechanism 405, the spool 396 is slidably moved in the rearward direction by the resilient biasing force of the compression spring 401 and returns to the neutral position, and the valve main body 395 is manipulated to close the valve, whereby the flow in of the pressurized oil (working oil) into the lift cylinders 351, 351 is stopped.

As a result, the lift arms 350, 350 assume the state in which the lift arms 350, 350 are hydraulically locked at the elevation rotating position thus holding the posture.

Further, when the lowering manipulation is performed by rotating the elevating/lowering lever in the frontward direction, the spool actuator 403 is slidably moved in the rearward direction, whereby the spool 396 is slidably moved in the rearward direction by the resilient biasing force of the compression spring 401.

As a result, the valve main body 395 is manipulated to open the valve in the lowering side, the pressurized oil which is supplied to the lift cylinders 351, 351 is made to flow out and both lift cylinders 351, 351 are contracted whereby the lift arms 350, 350 which are interlockingly connected to the respective lift cylinders 351, 351 are rotated downwardly.

Then, when the feedback link mechanism 405 is interlocked with the lowering rotation of the lift arms 350, 350 and the slidable movement of the spool actuator 403 in the rearward direction is released by the feedback link mechanism 405, the spool 396 is slidably moved in the frontward direction against the resilient biasing force of the compression spring 401 and returns to the neutral position, and the valve main body 395 are manipulated to close the valve whereby the flow-out of the pressurized oil from the lift cylinders 351, 351 is stopped.

As a result, the lift arms 350, 350 assume the state in which the lift arms 350, 350 are hydraulically locked at the lowering rotated position thus holding the posture.

Here, in this embodiment, by mounting the sealing member 399 having a sealing structure to the valve cover body 387, by forming the sub spool projecting hole 445 in the sealing member 399, and by allowing the sub spool 440 to penetrate the sub spool projecting hole 445, and by interposing the sub spool 440 between the spool 396 provided to the hydraulic control valve 342 and the spool actuator 403, even when the accuracy of concentricity of the spool 396 and the sub spool projecting hole 445 is made more or less offset due to a mounting error of the hydraulic control valve 342, it is possible to sufficiently ensure the slide operation of the sub spool 440 in the sub spool projecting hole 445 and hence, it is possible to surely transmit an actuation force of the spool actuator 403 to the spool 396 by way of the sub spool 440.

Accordingly, it is possible to favorably ensure the hydraulic control performed by the hydraulic control valve 342.

Further, in this embodiment, as shown in the partially enlarged view of FIG. 22, a front end surface 441 which constitutes a contact surface of the sub spool 440 with the spool 396 is formed in an arcuate surface which bulges frontwardly.

In this manner, since the front end surface 441 which defines the contact surface of the sub spool 440 is formed in an arcuate surface which bulges frontwardly, even when the accuracy of concentricity of the spool 396 and the sub spool projecting hole 445 is made more or less offset due to a mounting error, it is possible to surely transmit an actuation force of the spool actuator 403 from the sub spool 440 to the spool 396 by way of the contact surfaces and hence, it is possible to ensure the hydraulic control performed by the hydraulic control valve 342 in a more favorable manner.

Here, by forming a rear end surface 442 as a contact surface of the spool 396 with the sub spool 440 in an arcuate surface which bulges rearwardly, the substantially same advantageous effect can be obtained.

Further, the front end surface 444 which constitute a contact surface of the spool actuator 403 with the sub spool 440 is also formed in an arcuate surface which bulges frontwardly.

In this manner, even when the accuracy of concentricity of the spool actuator 403 and the sub spool projecting hole 445 is made more or less offset due to a mounting error, it is possible to surely transmit an actuation force of the spool actuator 403 to the sub spool 440 by way of the contact surfaces and hence, it is possible to ensure the hydraulic control performed by the hydraulic control valve 342 in a more favorable manner.

INDUSTRIAL APPLICABILITY

The structure of a tractor according to the present invention is effectively applicable to the structure in which the lift arm is mounted by way of the lift arm support body on the upper portion of the transmission casing and, at the same time, the lift arm can be hydraulically controlled by the hydraulic control valve by way of the hydraulic circuit body. Start here

The invention claimed is:

1. A tractor, comprising:
a transmission casing;
a lift arm support body;
a hydraulic circuit body which is detachably mounted on the lift arm support body;
a hydraulic control valve;
a lift arm being mounted on an upper portion of the transmission casing by way of said lift arm support body, the lift arm being hydraulically controllable by said hydraulic control valve by way of said hydraulic circuit body; and
a valve cover body being mounted on the hydraulic circuit body, the hydraulic control valve being housed in an inside of the valve cover body, the hydraulic control valve including a drain which is dischargeable through a drain circuit formed in an inside of the hydraulic circuit body by way of a drain receiving space which is formed in the inside of the valve cover body.

2. A tractor according to claim 1, wherein:
the hydraulic circuit body is detachably mounted on the transmission casing by way of the lift arm support body;
the valve cover body is formed of an upper-surface open-ended box;
an upper end peripheral portion of the valve cover body is hermetically mounted on a lower portion of the hydraulic circuit body; and
a lower portion of the valve cover body is arranged in the inside of the transmission casing.

3. A tractor, comprising:
a hydraulic circuit body;
a hydraulic control valve;
a lift arm being hydraulically controllable by said hydraulic control valve by way of said hydraulic circuit body;
a valve cover body being mounted on the hydraulic circuit body, the hydraulic control valve being housed in an inside of the valve cover body;
a spool being mounted in the hydraulic control valve;
a spool actuator being arranged outside the valve cover body, and which actuates the spool;
a sub spool being interposed between said spool and said spool actuator, the sub spool being configured such that a sealing member having the sealing structure is mounted in the valve cover body, a sub spool projecting hole being formed in the sealing member, and the sub spool being arranged in the sub spool projecting hole in a penetrating manner, at least one of a contact surface of the spool with the sub spool or a contact surface of the sub spool with the spool being formed in an arcuate surface which bulges outwardly.

* * * * *